United States Patent
Abdunabi

(10) Patent No.: US 11,630,870 B2
(45) Date of Patent: Apr. 18, 2023

(54) ACADEMIC SEARCH AND ANALYTICS SYSTEM AND METHOD THEREFOR

(71) Applicant: Tarek A. M. Abdunabi, Ottawa (CA)

(72) Inventor: Tarek A. M. Abdunabi, Ottawa (CA)

(*) Notice: Subject to any disclaimer, the term of this patent is extended or adjusted under 35 U.S.C. 154(b) by 0 days.

(21) Appl. No.: 17/142,996

(22) Filed: Jan. 6, 2021

(65) Prior Publication Data

US 2021/0209177 A1  Jul. 8, 2021

Related U.S. Application Data

(60) Provisional application No. 62/957,565, filed on Jan. 6, 2020.

(51) Int. Cl.
| | |
|---|---|
| *G06F 7/02* | (2006.01) |
| *G06F 16/00* | (2019.01) |
| *G06F 16/951* | (2019.01) |
| *G06N 20/00* | (2019.01) |
| *G06F 9/54* | (2006.01) |
| *G06F 16/9538* | (2019.01) |

(52) U.S. Cl.
CPC ............ *G06F 16/951* (2019.01); *G06F 9/547* (2013.01); *G06F 16/9538* (2019.01); *G06N 20/00* (2019.01)

(58) Field of Classification Search
CPC .... G06F 16/951; G06F 16/953; G06F 16/243; G06F 16/9538; G06F 9/547; G06F 16/38; G06F 16/93; G06N 20/00
See application file for complete search history.

(56) References Cited

U.S. PATENT DOCUMENTS

| | | | |
|---|---|---|---|
| 6,314,420 B1 | 11/2001 | Lang et al. | |
| 6,421,675 B1 | 7/2002 | Ryan et al. | |
| 6,640,223 B1 | 10/2003 | Jones et al. | |
| 7,849,048 B2 * | 12/2010 | Langseth | G06F 16/254 |
| | | | 707/602 |
| 8,805,814 B2 | 8/2014 | Zijlstra et al. | |
| 9,311,410 B2 | 4/2016 | Green et al. | |
| 9,398,022 B2 * | 7/2016 | Piliouras | G06Q 30/0269 |
| 9,483,169 B2 | 11/2016 | Horn | |

(Continued)

FOREIGN PATENT DOCUMENTS

CN   112052411   12/2020

OTHER PUBLICATIONS

Dean Whitehead, "Searching and reviewing the research literature," Chapter 3 in book: Nursing & Midwifery Research: Methods and Appraisal for Evidence-Based Practice, pp. 35-56 (2013).

*Primary Examiner* — Bruce M Moser
(74) *Attorney, Agent, or Firm* — IP-MEX Inc.; Victoria Donnelly

(57) ABSTRACT

An apparatus and method for academic search and analytics insights have been provided. The apparatus includes an ingestion component, obtaining data from external heterogeneous sources, to produce ingested data; a processing component for processing the ingested data; a search and analytics component for executing search queries on the ingested data and generating analytics insights on returned search result; and a storage component for storing the ingested data, the storage component acting as a communication data bus for the ingestion component, the processing component and the search and analytics component. Corresponding server and network system are have been provided.

20 Claims, 22 Drawing Sheets

(56) References Cited

U.S. PATENT DOCUMENTS

| | | |
|---|---|---|
| 10,210,184 B2 | 2/2019 | Abajian et al. |
| 10,509,817 B2 | 12/2019 | Reynar et al. |
| 10,585,963 B2 | 3/2020 | Hancock |
| 2008/0154848 A1 | 6/2008 | Haslam et al. |
| 2011/0093449 A1 | 4/2011 | Belenzon et al. |
| 2013/0080266 A1* | 3/2013 | Molyneux ............... G06Q 10/00 715/234 |
| 2017/0004199 A1* | 1/2017 | Häusler ................. G06F 16/285 |
| 2017/0286549 A1* | 10/2017 | Chandnani .............. G06F 16/81 |
| 2021/0011961 A1* | 1/2021 | Guan .................. G06F 3/04842 |
| 2021/0117417 A1* | 4/2021 | Hendrickson .......... G06N 20/00 |
| 2021/0256094 A1* | 8/2021 | Benara .................. G06F 40/186 |

\* cited by examiner

1

ACADEMIC SEARCH AND ANALYTICS SYSTEM AND METHOD THEREFOR

CROSS REFERENCE TO RELATED APPLICATIONS

The present application claims the benefit from the U.S. patent provisional application Ser. No. 62/957,565 filed Jan. 6, 2020, the entire contents of which are incorporated herein by reference.

FIELD OF THE INVENTION

The present invention generally relates to search engines and analytics tools for search engines. In particular, the invention is directed to the academic search and analytics system and method therefor.

BACKGROUND OF THE INVENTION

A volume of academic, scientific and engineering data and literature, and various other data/literature in general, keeps increasing every year. This results in continuously increasing efforts applied by users for collecting and analyzing an available data/literature.

Accordingly, there is a need in the industry for developing an automated system and method for academic search and analytics insights, which would eliminate of obviate the above noted problem.

SUMMARY OF THE INVENTION

There is an object of the present invention to develop a method and system for academic search and analytics insights, which would provide faster and easier search and analysis of vast volume of data.

According to one aspect of the invention, there is provided a method for academic search and analytics insights as substantially described herein, with a particular reference to the drawings.

According to another aspect of the invention, there is provided a system for academic search and analytics insights as substantially described herein, with a particular reference to the drawings.

According to yet another aspect of the invention, there is provided an apparatus for academic search and analytics insights, comprising:
a memory device having computer readable instructions stored thereon for execution by a processor, forming:
an ingestion component, obtaining data from external heterogeneous sources, to produce ingested data;
a processing component for processing the ingested data;
a search and analytics component for executing search queries on the ingested data and generating analytics insights on returned search result; and
a storage component for storing the ingested data, the storage component acting as a communication data bus for the ingestion component, the processing component and the search and analytics component.

In the apparatus described above, the ingestion component further comprises an enrichment module for automatically obtaining additional or missing attributes of the ingested data from other sources.

In the apparatus described above, the enrichment module is further configured to obtain latitude and longitude coordinates of a university, and authors affiliated with the university, by querying an external application programming interface of an online mapping tool.

In the apparatus described above, the ingestion component further comprises a format conversion module for converting the ingested data from the external heterogeneous sources into a common format for further processing.

In the apparatus described above, the ingestion component further comprises a cross-referencing module for linking related information from the ingested data into a single record per entity.

In the apparatus described above, the ingestion component further comprises:
an application programming interface, API, module for automatically fetching data from external databases having API interfaces; and
a crawlers module for crawling, in parallel, predefined websites for extracting predetermined attributes.

In the apparatus described above, the processing component further comprises:
a natural language processing module, in communication with:
a machine learning modeling module for grouping related data into topics and identifying respective keywords;
a communities and influencers detection module for identifying communities of researchers; and
a trends and discovery prediction module for predicting predetermined use cases based on historic data.

In the apparatus described above, the trends and discovery prediction module is configured to predict one or more of the following:
a sudden increase or decrease in a number of publications of a specific research topic;
a future number of publications per keywords or topic based on historic data;
a future number of citations per paper.

In the apparatus described above, the communities of researchers comprise one or more of the following:
community of researchers who collaborate with each other;
community of citations.

In the apparatus described above, the search and analytics component further comprises:
a search module for fetching data from the storage component based on a search query, to produce fetched data;
an analytics module for generating analytics insights based on the fetched data; and
a dashboard module for presenting the fetched data along with the analytics insights.

In the apparatus described above, the external heterogeneous sources comprise one or more of the following:
academic publishers Application Programming Interface, API;
universities/institutions websites;
journal/conferences websites;
patent databases;
research grant databases.

According to one more aspect of the invention, there is provided a method for academic search and analytics insights, comprising:
employing at leas one hardware processor for:
obtaining data from external heterogeneous sources, to produce ingested data;
processing the ingested data;
executing search queries on the ingested data and generating analytics insights on returned search result; and storing the ingested data in a memory device, the memory device acting as a communication data bus for the steps of obtaining, the processing and the executing.

The method further comprises enriching the ingested data, comprising automatically obtaining additional or missing attributes of the ingested data from other sources.

In the method described above, the enriching further comprises obtaining latitude and longitude coordinates of a university, and authors affiliated with the university, by querying an external application programming interface of an online mapping tool.

In the method described above, the obtaining further comprises converting the ingested data from the external heterogeneous sources into a common format for further processing.

In the method described above, the obtaining further comprises a cross-referencing the ingested data, comprising linking related information from the ingested data into a single record per entity.

In the method described above, the obtaining further comprises:
automatically fetching data from external databases having application programming interfaces, APIs; and
crawling, in parallel, predefined websites for extracting predetermined attributes.

In the method above, the processing further comprises:
natural language processing of the ingested data in communication with:
machine learning modeling for grouping related data into topics and
identifying respective keywords;
identifying communities and influencers among researchers; and
predicting predetermined use cases based on historic data.

In the method described above, the predicting comprises one or more of the following:
predicting a sudden increase or decrease in a number of publications of a specific research topic;
predicting a future number of publications per keywords or topic based on historic data;
predicting a future number of citations per paper.

In the method described above, the identifying the communities further comprise one or more of the following:
identifying community of researchers who collaborate with each other;
identify community of citations.

In the method described above, the executing further comprises:
fetching the stored ingested based on a search query, to produce fetched data;
generating analytics insights based on the fetched data; and
presenting the fetched data along with the analytics insights at a dashboard.

In the method described above, the obtaining comprises obtaining from the external heterogeneous sources comprising one or more of the following:
academic publishers Application Programming Interface, API;
universities/institutions websites;
journal/conferences websites;
patent databases;
research grant databases.

According to one more aspect of the invention, there is provided a server for academic search and analytics insights, comprising:

a memory device having computer executable instructions stored thereon for execution by a processor, causing the processor to:
obtain data from external heterogeneous sources, to produce ingested data;
process the ingested data;
execute search queries on the ingested data and generate analytics insights on search result; and
store the ingested data in a storage memory;
wherein the computer executable instructions cause the processor to process the ingested and execute search queries via communications with the storage memory.

According to yet one more aspect of the invention, there is provided a system for academic search and analytics insights, comprising:

a server for academic search and analytics insights, comprising:
a memory device having computer executable instructions stored thereon for execution by a processor, causing the processor to:
obtain data from external heterogeneous sources, to produce ingested data;
process the ingested data;
execute search queries on the ingested data and generate analytics insights on search result; and
store the ingested data in a storage memory;
wherein the computer executable instructions cause the processor to process the ingested and execute search queries via communications with the storage memory;
and
a client device in communication with the server over a communication network.

Thus, an improved method, apparatus and system for academic search and analytics have been provided.

BRIEF DESCRIPTION OF THE DRAWINGS

Embodiments of the present invention will be further described with reference to the accompanying exemplary drawings, in which.

DETAILED DESCRIPTION OF THE EMBODIMENTS OF THE INVENTION

Various aspects are now described with reference to the drawings. As used in this application, the terms "component", module", "system", and the like are intended to refer to a computer-related entity, either hardware, software, a combination of hardware and software, or software in execution.

Various aspects will be presented in terms of the system that may include a number of components, modules, and the like. It is to be noted that the system may include additional components, modules, etc. and/or may not include all the components, modules, etc. discussed in connection with the figures.

Figure 1:
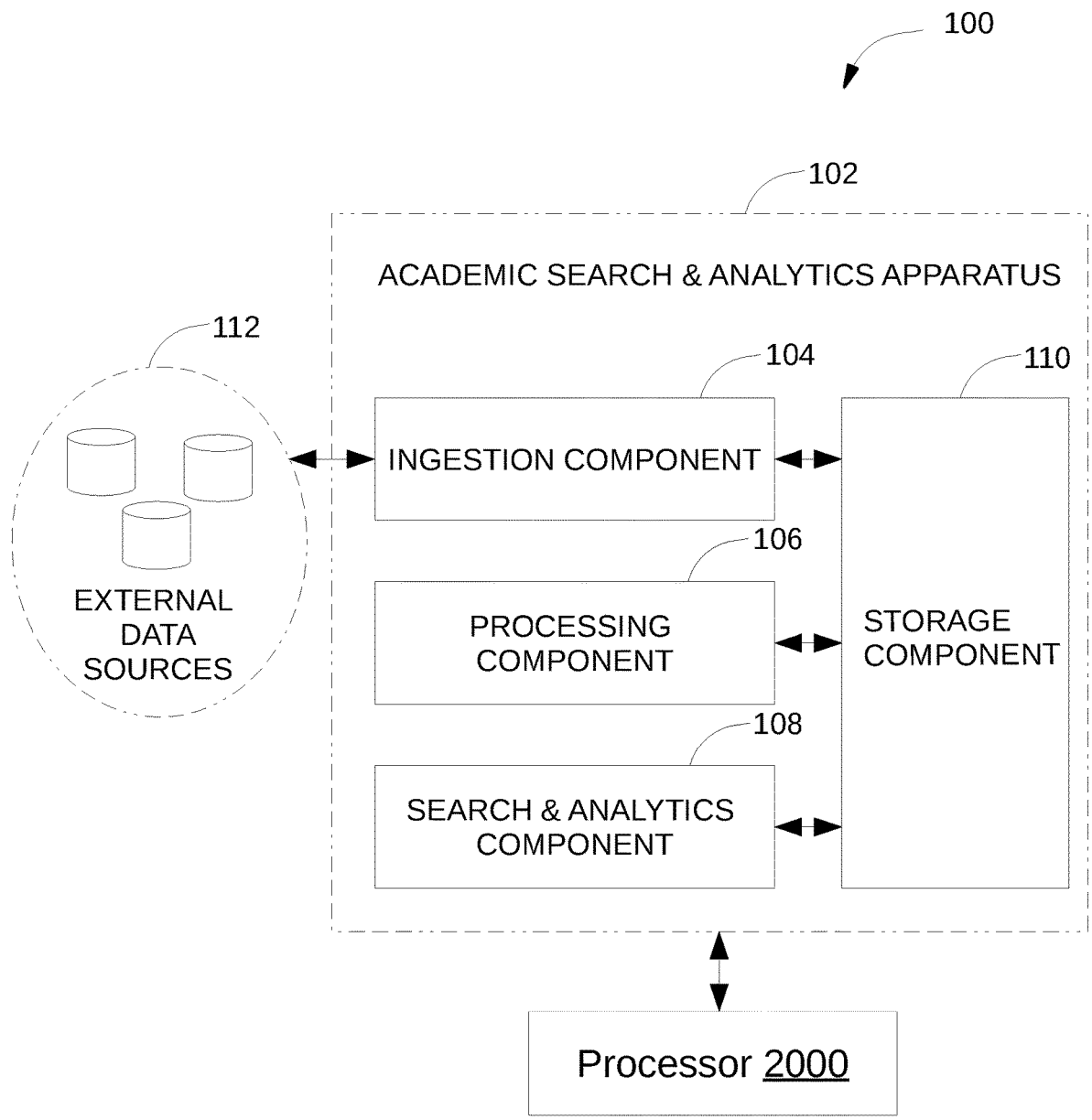
FIG. 1 illustrates a block diagram of a system of an embodiment of the invention for academic search and analytics insights.

FIG. 1 illustrates a system for academic search and analytics insights 100 that acquires data related to academic's literature from heterogeneous sources, processes the data, and provides search and analytics insights capabilities to a user.

In further details, system 100 includes external data sources 112, and an academic search and analytics apparatus 102, which enables a user to see a holistic view of search queries by providing not just a list of relevant documents, e.g. research papers, but also, a dashboard of analytics insights over multiple dimensions.

Some examples of analytics insights may include, but not limited to, geographical distribution of papers per university/research institution or country, distribution of patents per country/company, distribution of papers/patents over time, distribution of documents per type of publication, e.g. journal, conference, book, patent, etc., distribution of papers per author, distribution of papers per number of citations, a cloud of most frequent terms, key/influencer papers/authors in the filed, communities of researchers, classification of papers into topics, trending research topics, recommended journals/conferences for future publications based on the search query, etc. The user can narrow/expand a search by interactively clicking on one, or more, of the provided insights.

The academic search and analytics apparatus 102 includes an ingestion component 104 that is tasked to fetch data from the external heterogeneous sources 112 and ingest them to the internal data storage component 110.

The academic search and analytics apparatus 102 also includes a processing component 106, which is responsible for processing the ingested data, using parallel execution frameworks, and indexing the end results using specific formats to facilitate performing search queries and analytics.

Additionally, the search and analytics apparatus 102 includes a search and analytics components 108, which is responsible for executing search queries and dynamically producing analytics insights on the returned results.

The storage component 110 provides a distributed storage for intermediate and final data.

The three components, the ingestion component 104, the processing component 106, and the search and analytics component 108 are decoupled from each other, i.e. they do not communicate directly with each other, and instead they use the distributed storage component 110 as data bus. The decoupling is a useful feature of the apparatus 102, which allows faster processing of massive data and higher throughput, by automatically scaling computing resources per component as required, without impacting the other components.

Figure 2:
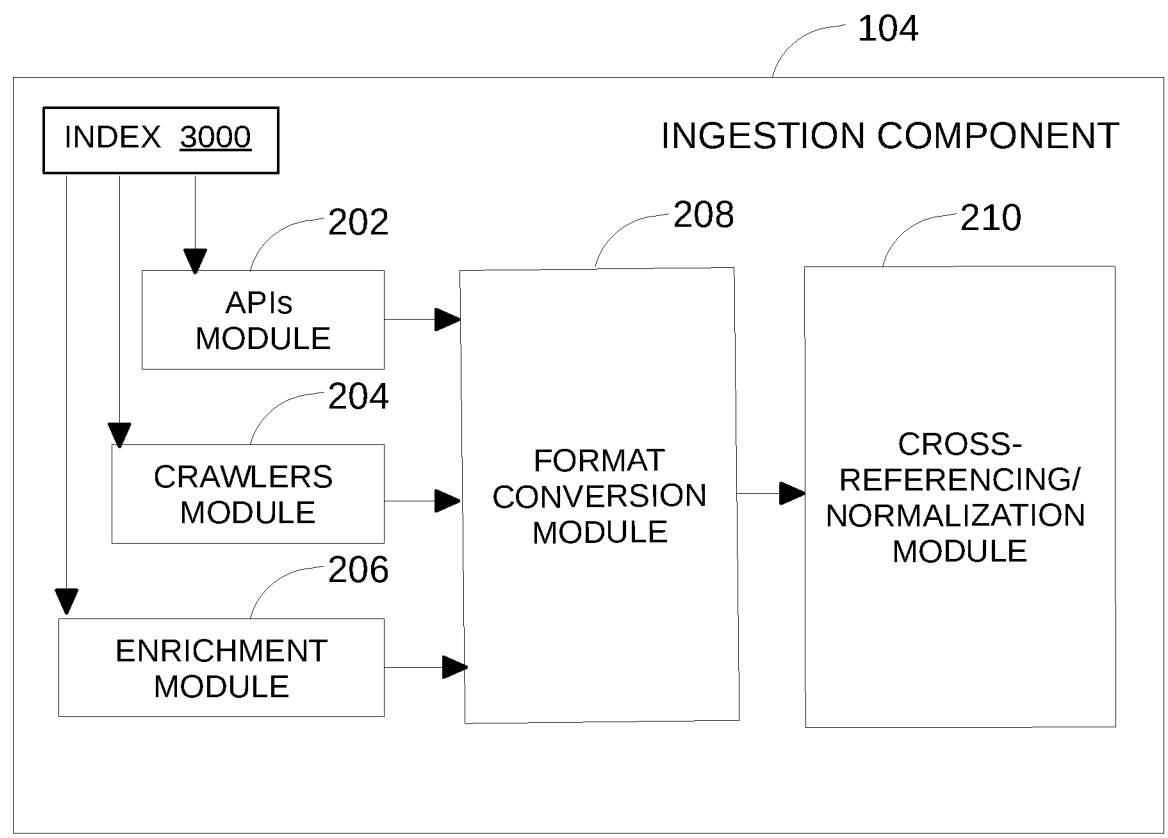
FIG. 2 illustrates a block diagram of the ingestion component 104 of the system of FIG. 1.

FIG. 2 illustrates the ingestion component 104 of FIG. 1 in greater detail, including the five modules 202, 204, 206, 208, and 210 described in detail below.

The APIs module 202 is responsible for automatic, and periodic, fetching of data from open-source/commercial databases that expose API interfaces.

A hardware processor 2000 engages the analytics apparatus 102, shown in FIG. 1.

Figure 2A:
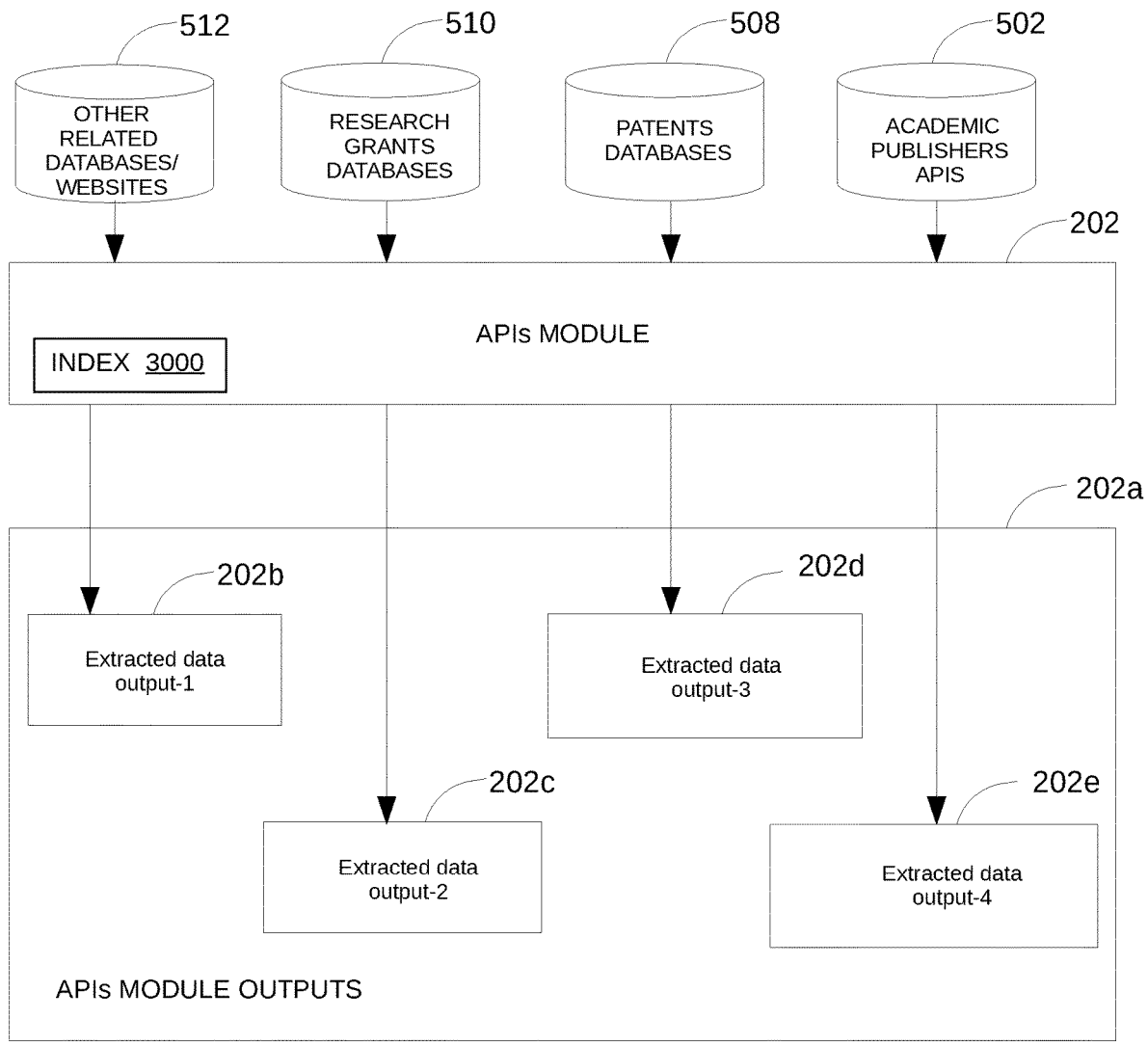
FIG. 2A illustrates example inputs and outputs of the APIs module 202 of the ingestion component 104 of FIG. 2.

FIG. 2A illustrates example inputs and outputs of the APIs module 202. The module contains components to periodically fetch data, based on database APIs, based on APIs authentication/subscription type and schemas, from the external data sources academic publishers APIs 502, patents databases 508, research grants databases 510, and other related databases/websites 512.

Example APIs module outputs 202a by the APIs module 202 may include:
  Academic publishers APIs 502: title, abstract, author(s), keywords, publisher, publication date, paper URL, author(s) affiliations, references, number of citations, etc.
  Patents databases 508: title, abstract, inventor(s), keywords, application number, status, publication date, classification, URL, assignee, etc.
  Research grants databases 510: title, funding, abstract, status, keywords, location, investigators, institute, etc.
  Other related databases/websites 512: number of citations for each paper, etc.
The APIs module outputs 202a include:
  Extracted data output-1 202b: Number of citations for each paper, etc.
  Extracted data output-2 202c: Title, Funding, Abstract, Status, Keywords, location, Investigators, institute, etc.
  Extracted data output-3 202d: Title, Abstract, Inventor(s), Application number, Status, Publication date, classification, URL, assignee, keywords, etc.

Extracted data output-4 202e: Title, Abstract, Author(s), Publisher, Publication date, URL, Author(s) affiliations, references, Citations, keywords, etc.

Figure 2B:
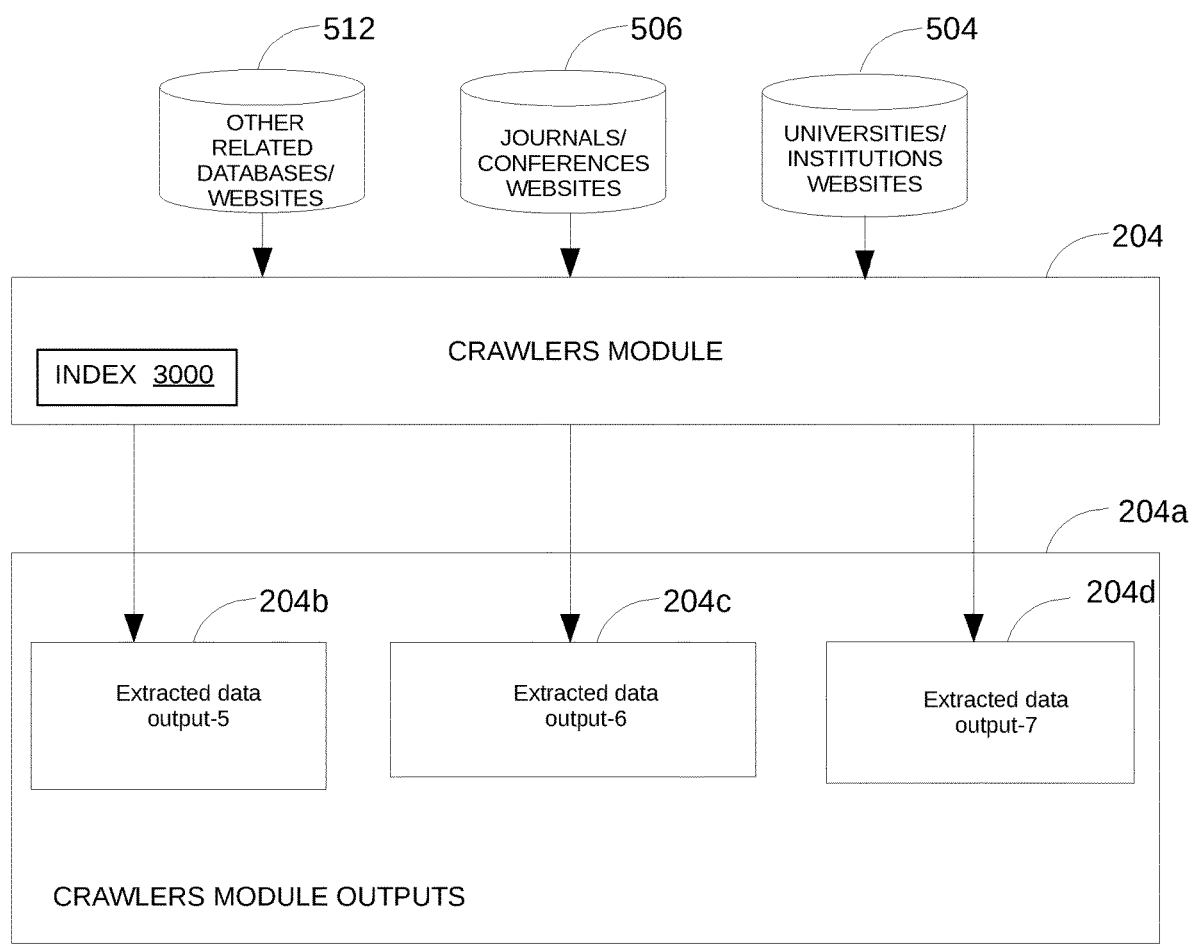
FIG. 2B illustrates example inputs and outputs of the crawlers module 204 of the ingestion component 104 of FIG. 2.

The crawlers module 204 automatically crawls, in parallel, a predefined list of websites to extract relevant attributes from the unstructured data from the websites, such as universities and conferences/journals websites, FIG. 2B illustrates example inputs and outputs of the crawlers module 204. The module crawls the external data sources universities/institutions websites 504, journals/conferences websites 506, and other related databases/websites 512.

Example outputs 204a by the crawlers module 204 may include:

Universities/institutions websites 504: name, website, country, research groups, etc.

Journals/conferences websites 506: title, aims & scope, rank, Impact factor, location, CiteScore, volumes/issues, published papers, etc.

Other related databases/websites 512: data from selected social Media accounts/blogs known for its scientific Interests, etc.

The Crawlers Module Outputs 204a include:

Extracted data output-5 204b: Data from selected social Media accounts/blogs known for its scientific interests, etc.

Extracted data output-6 204c: Title, aims & scope, rank, Impact factor, location, CiteScore, volumes/issues, published papers, etc.

Extracted data output-7 204d: Name, website, country, research groups, etc.

The crawlers module 204 is guided by an internal index 3000, which decides what data/websites need to be fetched/crawled. The internal index 3000 enables parallel execution for independent crawlers and eliminates duplicate work, which leads to faster and more efficient data ingestion.

Another useful feature of the academic search and analytics apparatus 102 of FIG. 1 is the enrichment of records by attributes that are not available, by design or missing, in some or all publishers databases. The enrichment is provided by the enrichment module 206, which automatically acquires additional/missing attributes from other external or/and internal sources.

Figure 2C:
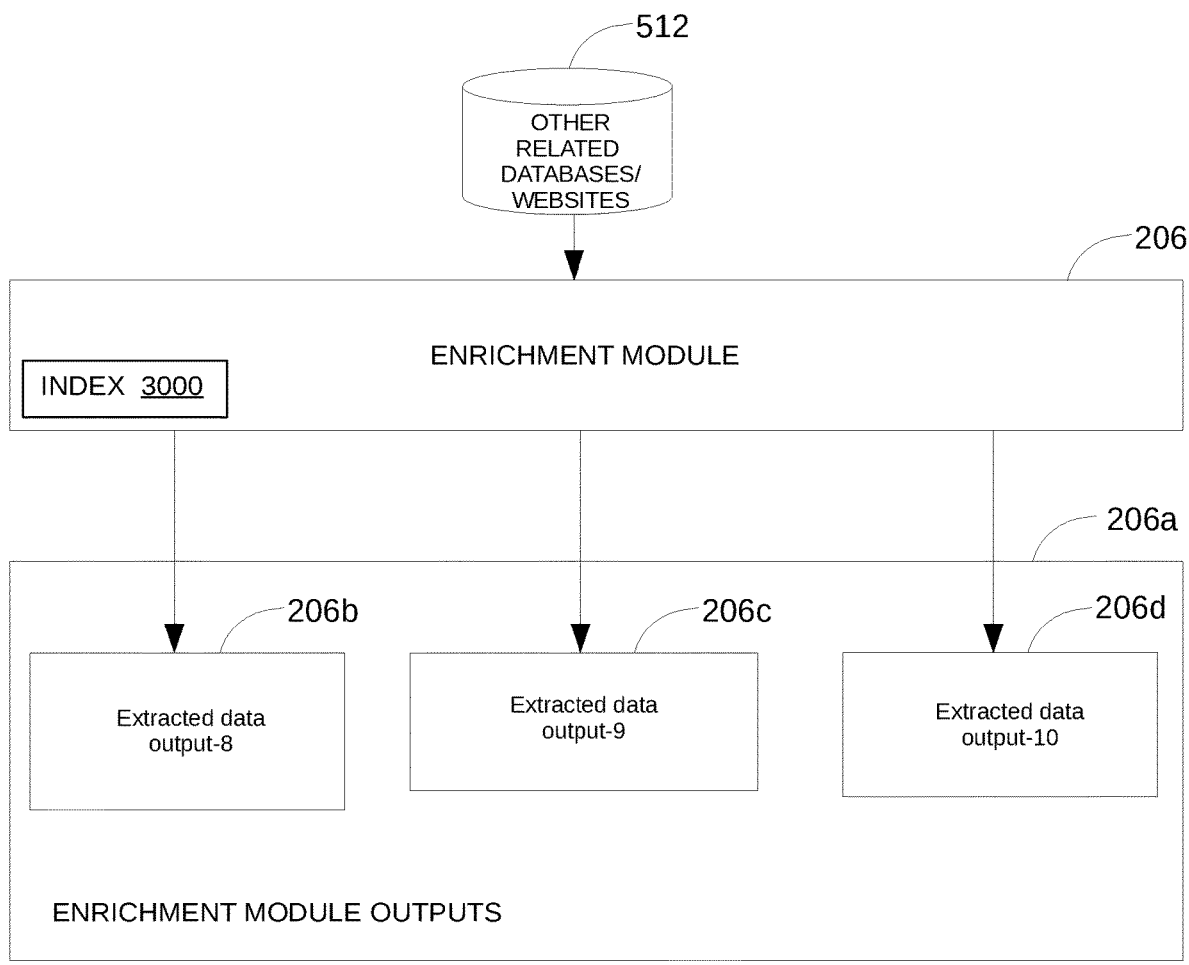
FIG. 2C illustrates example inputs and outputs of the enrichment module 206 of the ingestion component 104 of FIG. 2.

FIG. 2C illustrates example inputs and outputs of the enrichment module 206, which enriches records by attributes that are not available, by design or missing, that are not provided by APIs and the Crawlers Module 204. For example, in order to display a geographical distribution of relevant documents per university/research institution, each record is enriched with latitude and longitude coordinates of universities, authors affiliated with the university/research institution, by querying external API such as Google Maps.

Another example is the enrichment of records by using information from author's personal websites, such as LinkedIn or/and university's homepage.

The Enrichment module outputs 206a include:

Extracted data output-8 206b: Latitude/longitude, country, or universities/institution, conferences locations, to display on a map, etc.

Extracted data output-9 206c: Authors profiles extracted from sources such as LinkedIn Profile API, etc.

Extracted data output-10 206d: Journals/Conferences rank, impact factor, etc.

Given the heterogeneity of data sources, each source has its own data format, which is not suitable for downstream processing. To overcome this technical challenge, a format conversion module 208 is utilized to produce one common format for further processing.

Figure 2D:
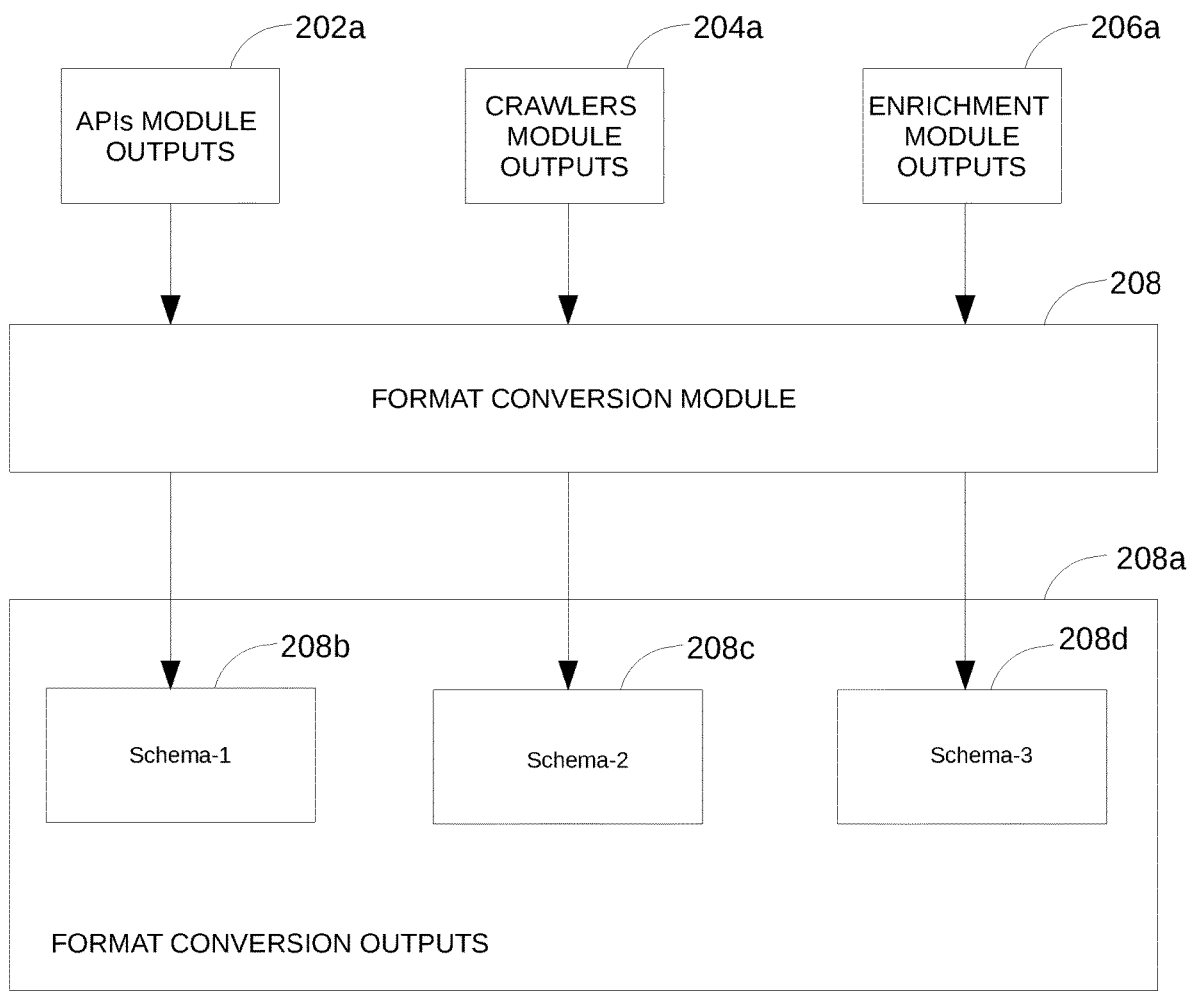
FIG. 2D illustrates example inputs and outputs of the format conversion module 208 of the ingestion component 104 of FIG. 2.

FIG. 2D illustrates example inputs and outputs of the format conversion module 208, which converts extracted data, from the heterogeneous sources to one, or more, common format(s)/schema(s), such as JavaScript Object Notation (JSON), Parquet, for further processing downstream. The module processes the APIs module outputs 202a, crawlers module outputs 204a, and enrichment module outputs 206a and produces outputs of these inputs with common format(s), schema(s) 208b, 208c, and 208d respectively.

The schema-1 208b includes API MODULE Output with common format(s)/schema(s). The schema-2 208c includes CRAWLERS MODULE Output with common format(s)/schema(s), and schema-3 208d includes ENRICHMENT MODULE Output with common format(s)/schema(s).

And finally, a cross-referencing/normalization module 210 links related attributes info into one single record per entity, deduplicates, and normalizes datasets.

One example of cross-referencing is linking a research paper's attributes, such as title, abstract, authors, affiliations, etc., retrieved from one external database, to its number of citations retrieved from another external database. The cross-referencing/normalization module 210 also has means for removing duplicates and corrupted records, and normalizing ingested data.

Figure 2E:
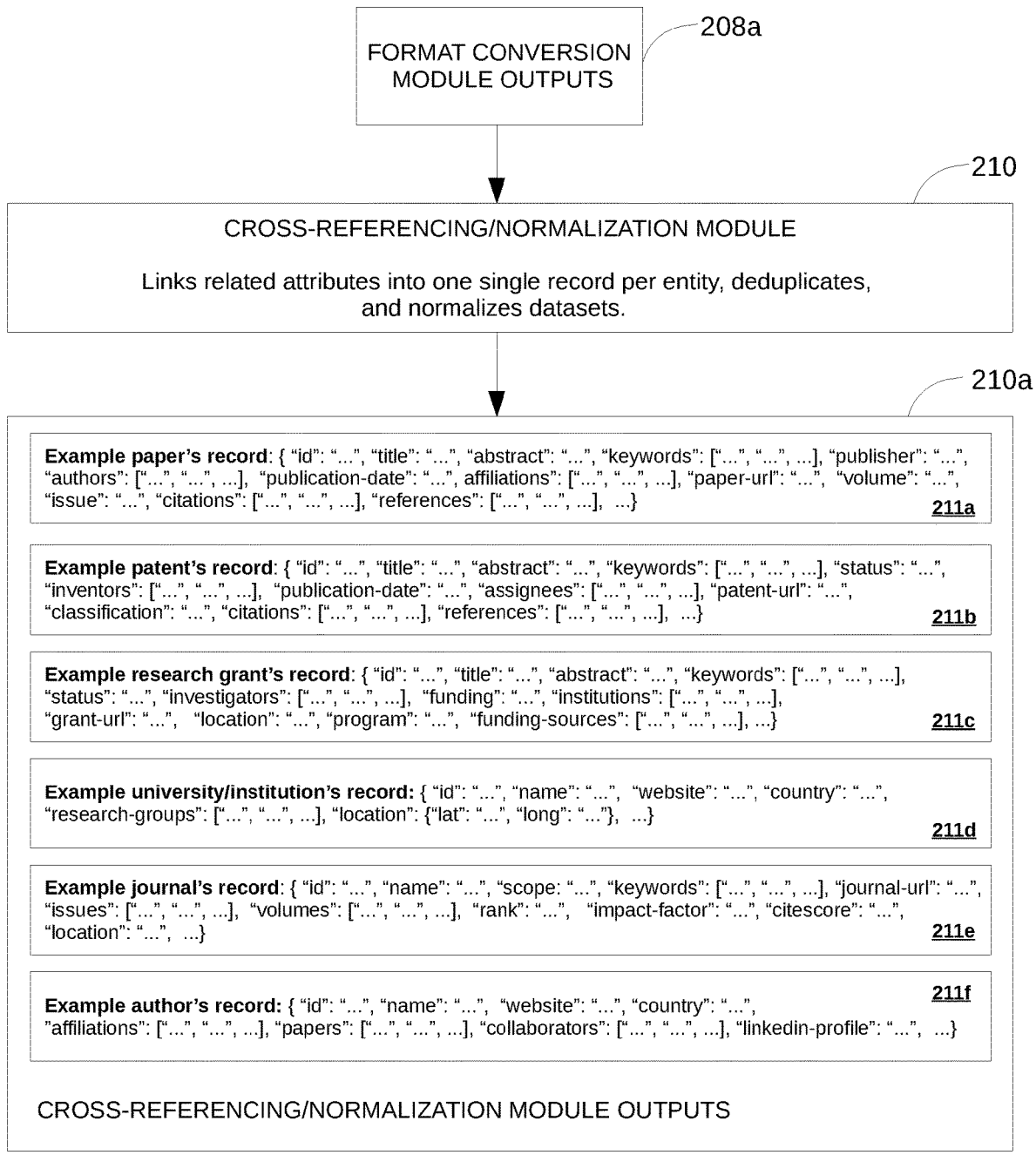
FIG. 2E illustrates example inputs and outputs of the cross-referencing/normalization module 210 of the ingestion component 104 of FIG. 2.

FIG. 2E illustrates example inputs and outputs of the format cross-referencing/normalization module 210. The module operates on the format conversion module outputs 208a and produces unified and normalized datasets.

Example outputs 210a by the cross-referencing/normalization module 210 may include, but not limited to:

Example paper's record 211a: {"id": " . . . ", "title": " . . . ", "abstract": " . . . ", "keywords": [" . . . ", " . . . ", . . . ], "publisher": " . . . ", "authors": [" . . . ", " . . . ", . . . ], "publication-date": " . . . ", affiliations": [" . . . ", " . . . ", . . . ], "paper-url": " . . . ", "volume": " . . . ", "issue": " . . . ", "citations": [" . . . " " . . . ", . . . ], "references": [" . . . ", " . . . ", . . . ], . . . }.

Example patent's record 211b: {"id": " . . . ", "title": " . . . ", "abstract": " . . . ", "keywords": [" . . . ", " . . . ", . . . ], "status": " . . . ", "inventors": [" . . . ", " . . . ", . . . ], "publication-date": " . . . ", "assignees": [" . . . ", " . . . ", . . . ], "patent-url": " . . . ", "classification": " . . . ", "citations": [" . . . ", " . . . ", . . . ], "references": [" . . . ", " . . . ", . . . ], . . . }.

Example research grant's record 211c: {"id": " . . . ", "title": " . . . ", "abstract": " . . . ", "keywords": [" . . . ", " . . . ", . . . ], "status": " . . . ", "investigators": [" . . . ", " . . . ", . . . ], "funding": " . . . ", "institutions": [" . . . ", " . . . ", . . . ], "grant-url": " . . . ", "location": " . . . ", "program": " . . . ", "funding-sources": [" . . . ", " . . . ", . . . ], . . . }.

Example university/institution's record 211d: {"id": " . . . ", "name": " . . . ", "website": " . . . ", "country": " . . . ", "research-groups": [" . . . ", " . . . ", . . . ], "location": {"lat": " . . . ", "long": " . . . "}, . . . }.

Example journal's record 211e: {"id": " . . . ", "name": " . . . ", "scope: " . . . ", "keywords": [" . . . ", " . . . ", . . . ], "journal-url": " . . . ", "issues": [" . . . ", " . . . ", . . . ], "volumes": [" . . . ", " . . . ", . . . ], "rank": " . . . ", "impact-factor": " . . . ", "citescore": " . . . ", "location": " . . . ", . . . }.

Example author's record 211*f*: {"id": " . . . ", "name": " . . . ", "website": " . . . ", "country": " . . . ", "affiliations": [" . . . ", " . . . ", . . . ], "papers": [" . . . ", " . . . ", . . . ], "collaborators": [" . . . ", " . . . ", . . . ], "linkedin-profile": " . . . ", . . . }.

Note: the "id" attribute is generated by the system to be used for cross-referencing/normalization across the types of records. IDs databases are maintained by the system for future data ingestion. The IDs databases are also used to guide which data the APIs module 202, crawlers module 204 and enrichment module 206 need to obtain.

Figure 2F:
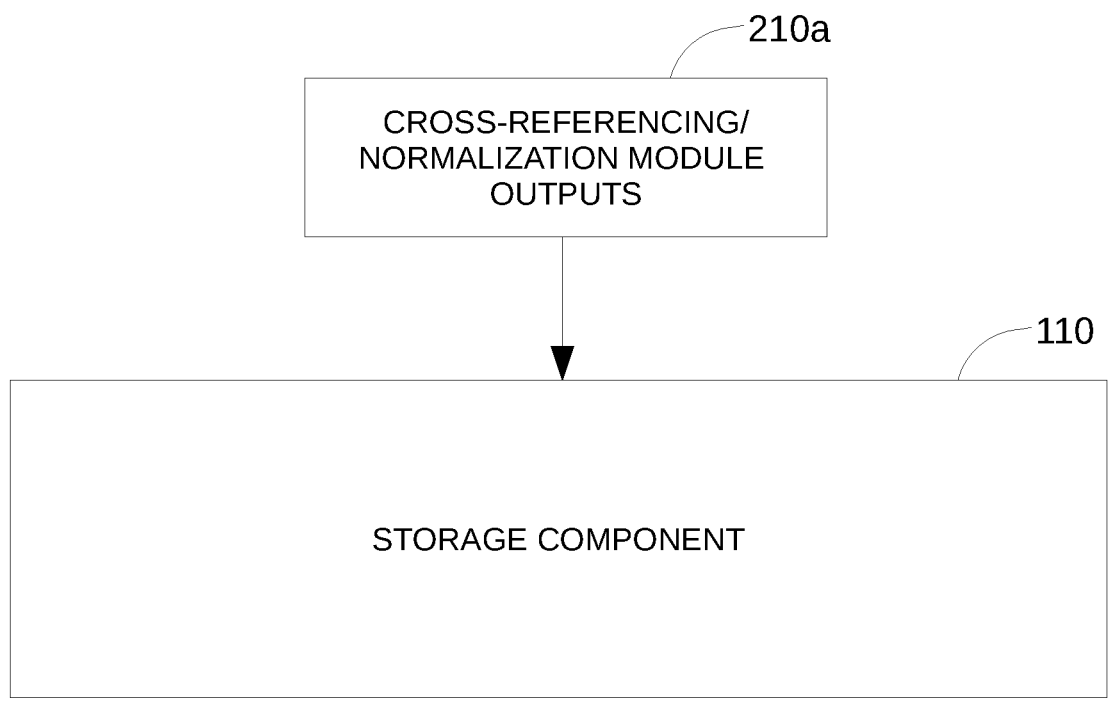
FIG. 2F illustrates data storage types used to store cross-referencing/normalization module outputs 210a of FIG. 2E.

FIG. 2F illustrates data storage types used to store cross-referencing/normalization module outputs 210*a*, which is linked to the storage component 110. Within the storage component 110, data storage types may include:

Object storage (e.g. Amazon S3, Azure Blob Storage, etc.) to store sim-structured compressed JSON, Parquet, etc., format files.

Relational, or non-relational, referred to as non-SQL, or Non Structured Query Language (NOSQL), databases to store reference data, such as IDs mappings, enrichment data, etc.

Search engine platform (e.g. ElasticSearch, etc.).

The ingestion component 104 has an internal index 3000 that keeps track of the data collected overtime, such as metadata for papers, patent, universities, journals, conferences, authors, inventors, etc. The APIs module 202, crawlers module 204, and enrichment module 206 use this index 3000 to coordinate work between them and guide what data needs to acquired. Overtime, the academic search and analytics engine 102 builds its internal databases, and data ingestion of static metadata (e.g. journal information, location of universities, authors information, etc.) is reduced.

The index 3000 is used to coordinate the work of the three modules 202, 204 and 206 of the ingestion component 104. For example, APIs module 202 fetches papers with authors' affiliations (i.e. universities). The names of the universities are written in the index 3000 as the target for the crawler module 204 and the enrichment modules 206 to go and fetch their metadata. The enrichment module 206 and the crawler module 204 read the universities list and fetch missing information, such as the location and metadata for that specific list. After fetching data for the list of universities, the modules 204 and 206 mark them as done in the index 3000, so for the future ingested papers with previously encountered universities, the modules 204 and 206 do not re-perform the work again. It is understood that any other data structure, instead of the index 3000, may be also used as long as it allows to achieve the same functionality.

Figure 3:
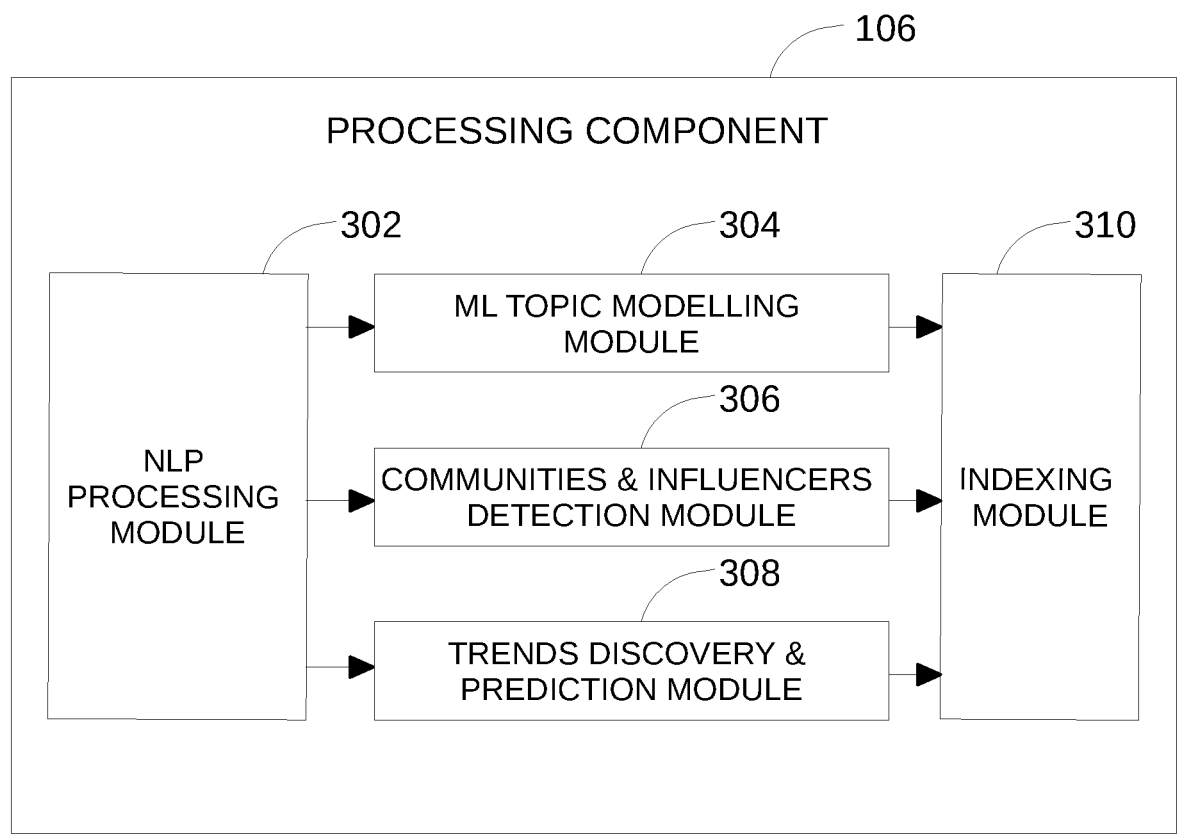
FIG. 3 illustrates a block diagram of the processing component 106 of the system of FIG. 1.

FIG. 3 illustrates a block diagram of the processing component 106 in greater detail. The processing component 106 includes an NLP (Natural Language Processing) processing module 302 responsible for performing standard and/or custom pre-processing of the ingested data for use by downstream modules.

Examples of NLP pre-processing may include, but not limited to, text cleaning, for example, removing stop words, punctuations, etc., tokenization, lemmatization, stemming, n-grams, and/or word2vec embeddings, to be used as input features to train Machine Learning (ML) models. Such features are used by downstream modules 304, 306, and 308 that are described in detail below.

Figure 3A:
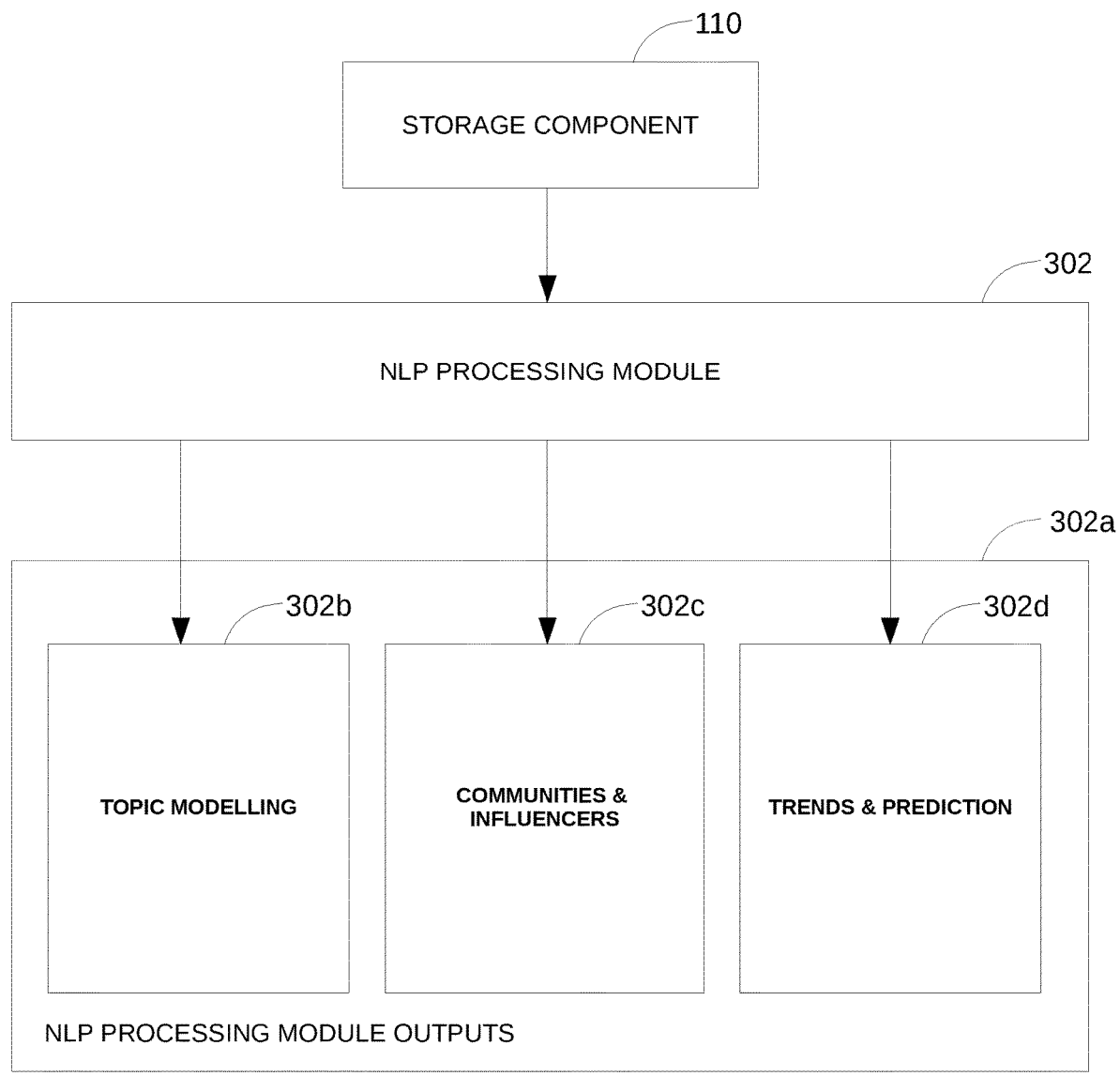
FIG. 3A illustrates example inputs and outputs of the Natural Language Processing (NLP) processing module 302 of the processing component 106 of FIG. 3.

FIG. 3A illustrates example inputs and outputs of the NLP processing module 302. The module loads data from the storage component 110, processes data, and produces several outputs 302*a*. Example outputs may include, but not limited to:

Data processing to be used by ML topic modelling model 304 is Topic Modelling output 302*b*: Example data processing, applied to title & Abstract, may include: text cleaning, tokenization, n-grams, stop-words removal, lemmatization, stemming, vector space representation, for example, bag-of-words, Term Frequency-Inverse Document Frequency (TF-IDF), Word2vec, Object2vec, etc.), etc.

Data processing to be used by communities & influences detection module 306 is Communities & Influencers output 302*c*: Example data processing may include extracting maps, per keywords/topic, of: paper→references, paper→citations, author→collaborators, patent→references, patent→citations, inventor→co-inventors, etc.

Data processing to be used by trends discovery and prediction module 308 is Trends & Prediction output 302*d*: Example data may include extracting Time-series of: keywords/topic→#papers, keywords/topic→#citations, keywords/topic→#patents, institution→#papers grouped keywords/topic, assignee→#patents, journal→#papers grouped by keywords/topic, etc.

In an embodiment of the invention, a ML topic modelling module 304 uses a standard ML algorithms, such as Latent Dirichlet Allocation (LDA), to group related papers into topics and identify top keywords/phrases per topic. This feature of the academic search and analytics apparatus 102, which allows a user to explore related papers by looking at visualized keywords/phrases per topic without the need to submit a search query.

Figure 3B:
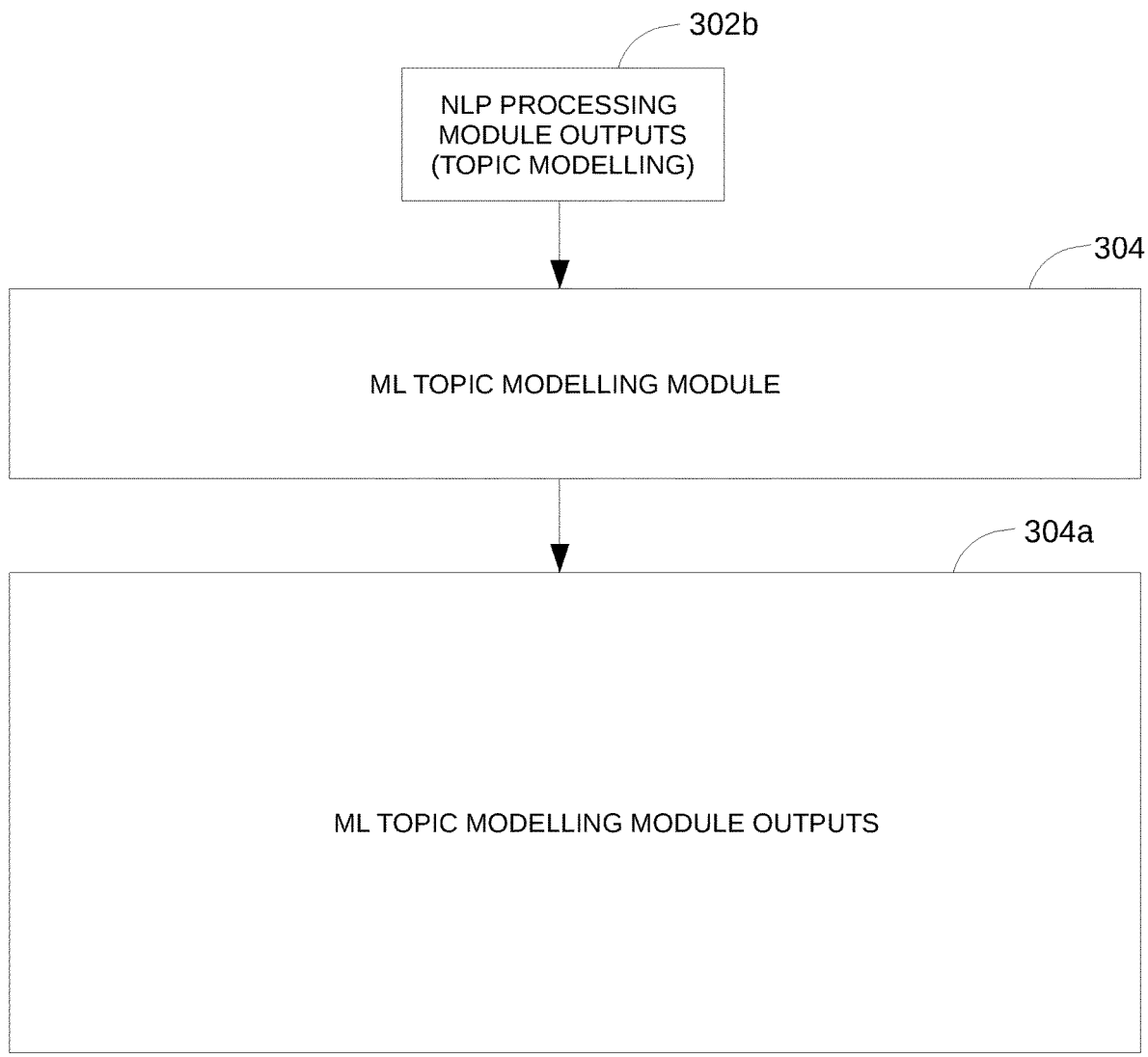
FIG. 3B illustrates example inputs and outputs of the Machine Learning (ML) topic modelling module 304 of the processing component 106 of FIG. 3.

FIG. 3B illustrates example inputs and outputs of the ML topic modelling module 304. An unsupervised algorithm(s), such as Latent Dirichlet Allocation (LDA), is applied individually and jointly to papers, research grants, journals/conferences, etc. For each dataset, similar documents are assigned to same topic, and top keywords/phrases per topic are generated. The module uses the output 302*b* of the NLP processing module 302. An unsupervised algorithm(s), such as LDA, is applied individually and jointly to papers, patents, research grants, journals/conferences, etc. For each dataset, similar documents are assigned to the same topic, and top keywords/phrases per topic are generated.

Example ML topic modelling module outputs 304*a* by the ML topic modelling module 304 may include, but not limited to:

Papers are automatically assigned to topics, and top keywords/phrases per topic are generated.

Patents are automatically assigned to topics, and top keywords/phrases per topic are generated.

Research grants are automatically assigned to topics, and top keywords/phrases per topic are generated.

Papers, patents and research grants are automatically assigned to topics (jointly), and top keywords/phrases per topic are generated.

A communities and influencers detection module 306 uses standard and/or custom algorithms, such as graph analytics algorithms, to automatically detect communities of researchers, i.e. researchers who collaborate with each other, or communities of citations.

Furthermore, using graph analytics algorithms, influencer papers/authors per research field/topic are identified to be presented later as visual insights.

Figure 3C:
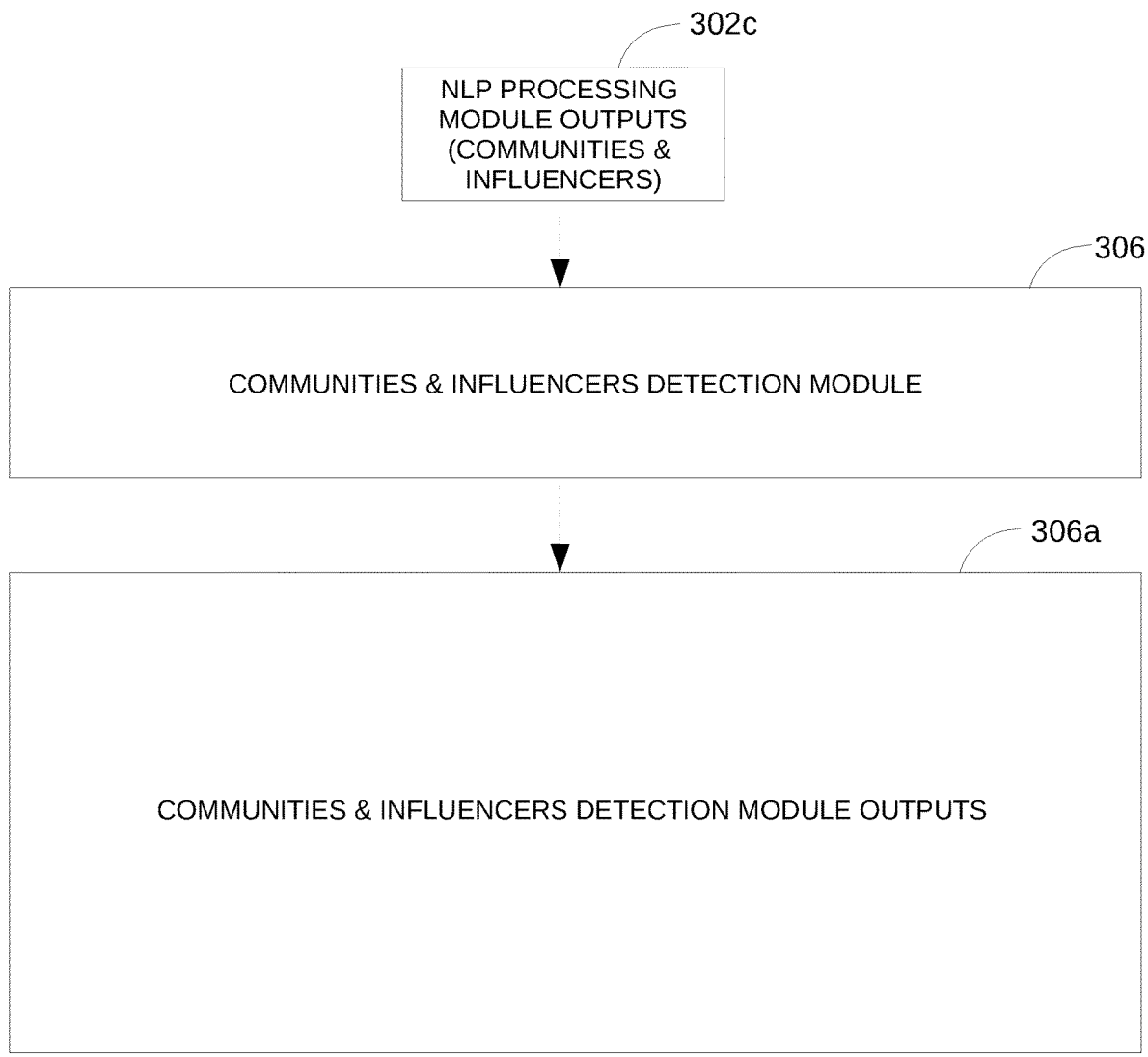
FIG. 3C illustrates example inputs and outputs of the communities and influencers detection module 306 of the processing component 106 of FIG. 3.

FIG. 3C illustrates example inputs and outputs of the communities & influencers detection module 306, in which standard and/or custom algorithms, such as graph analytics algorithms, are applied to each dataset combination (extracted by the NLP Processioning Module 302). The module applies graph analysis algorithms to the output 302c of the NLP processing module 302.

Example communities & influencers detection module outputs 306a by the communities and influencers detection module 306 may include, but not limited to:
  Communities of collaborators (researchers) per keywords/topic,
  Influencers (authors) per keywords/topic,
  Influencers (papers) per keywords/topic,
  Influencers (patents) per keywords/topic,
  Influencers (Journals) per keywords/topic,
  Influencers (Universities/Institutions) per keywords/topic,
  Influencers (Conferences) per keywords/topic,
  Influencers (research groups) per keywords/topic,
  Communities of inventors per keywords/topic.

Additionally, a trends discovery and prediction module 308 utilities standard and/or custom ML/statistical algorithms to train models on historical data and provide detection and various use-cases of prediction.

For example, in one embodiment, a trained model detects a sudden increase/decrease in the number of publications of a specific research keywords/topic. For example, statistical approaches, such as calculating moving average and standard deviation over specified timeframes (last month, 1 year, 5 years, etc.) are used, followed by marking the data points that are outside those limits as anomalous. Alternatively or additionally, advanced unsupervised anomaly detection algorithms, such as Isolation Forest, Self Organizing Maps (SOM) neural network, may be also utilized.

In another embodiment, an another model predicts a future number of publications per keywords/topic, or a future number of citations per paper. ML regression algorithms, such as linear regression, neural networks, etc., are used to train models on historical time-series data to predict future data. For example, time-series of keywords/topic and number of corresponding number of publications are derived from the historical data over specific timeframes, for example, a month, a year, etc., followed by applying regression models that are then trained using the time-series, where the input is a time-series of keywords/topic and the output is a time-series of number of publications for the corresponding keywords/topic. The models are trained periodically and used to produce predictions for the future timeframe, i.e. number of publication per keywords/topic for next month, next year, etc.

Figure 3D:
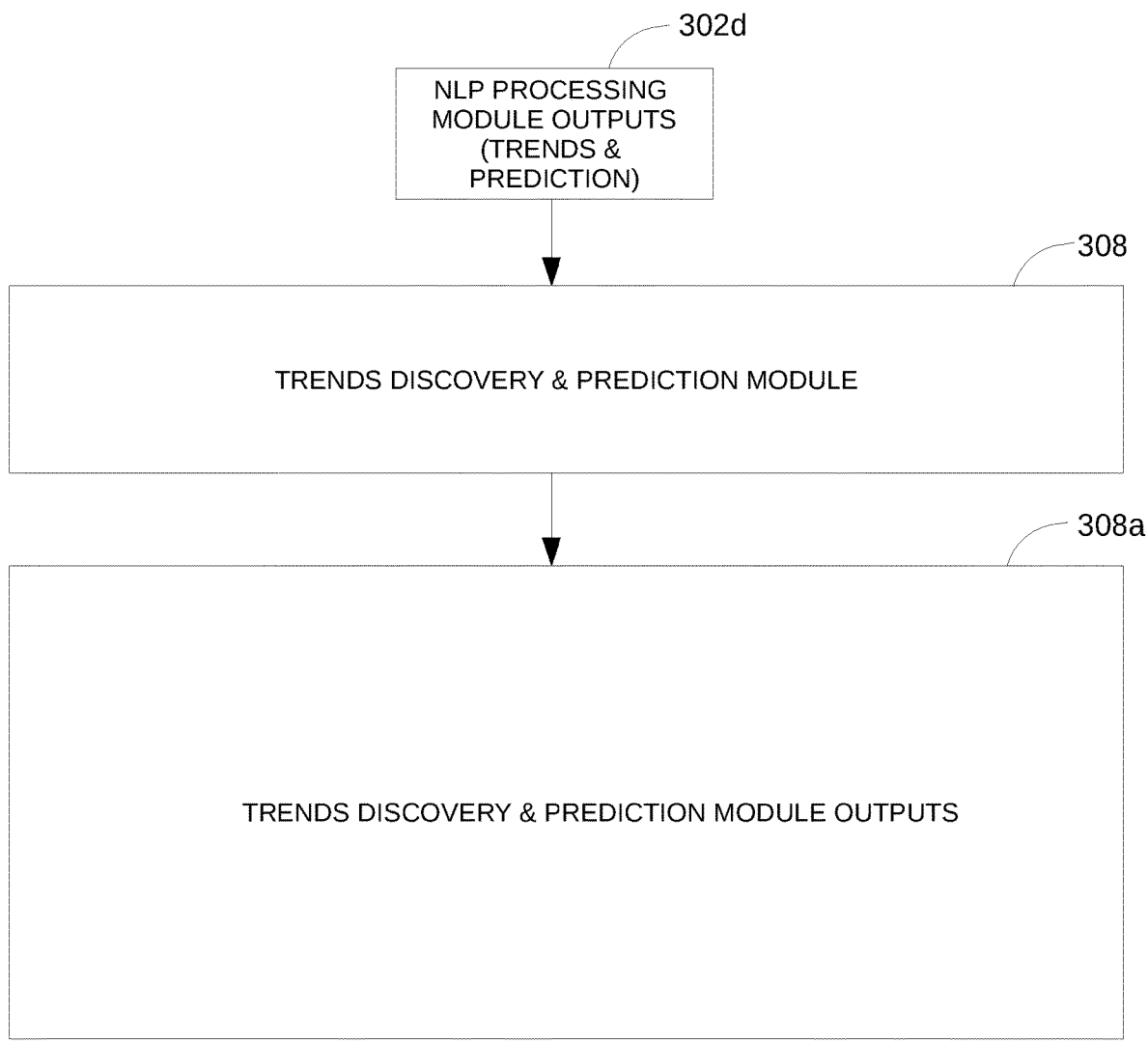
FIG. 3D illustrates example inputs and outputs of the trends discovery and prediction module 308 of the processing component 106 of FIG. 3.

FIG. 3D illustrates example inputs and outputs of the trends discovery & prediction module 308, in which standard and/or custom statistical/ML algorithms are used to train models on the historical datasets to provide trends discovery/visualization, and various use-cases prediction for each dataset combination, extracted by the NLP Processing Module 302. The module 308 uses the output 302d of the NLP processing module 302.

Example outputs 308a by the trends discovery and prediction module 308 may include, but not limited to:
  Example outputs of trends (i.e. time-series) of: keywords/topic→number of papers, keywords/topic→number of patents, keywords/topic→number of papers grouped by university/institution, university/institution→number of papers grouped keywords/topic, assignee→number of patents, journal→number of papers, journal→number of papers grouped by keywords/topic, etc.
  Example outputs of predictions: future number of publications per keywords/topic, future number of publications per university/institution, future number of patents per classification, future number of papers per journal per keywords/topic, etc.

And finally, an indexing module 310 indexes each output using a suitable format/technology, and writes the results produced by the modules 302, 304, 306, and 308 to the storage component 110 in a format suitable for use by the search and analytics component 108.

Figure 3E:
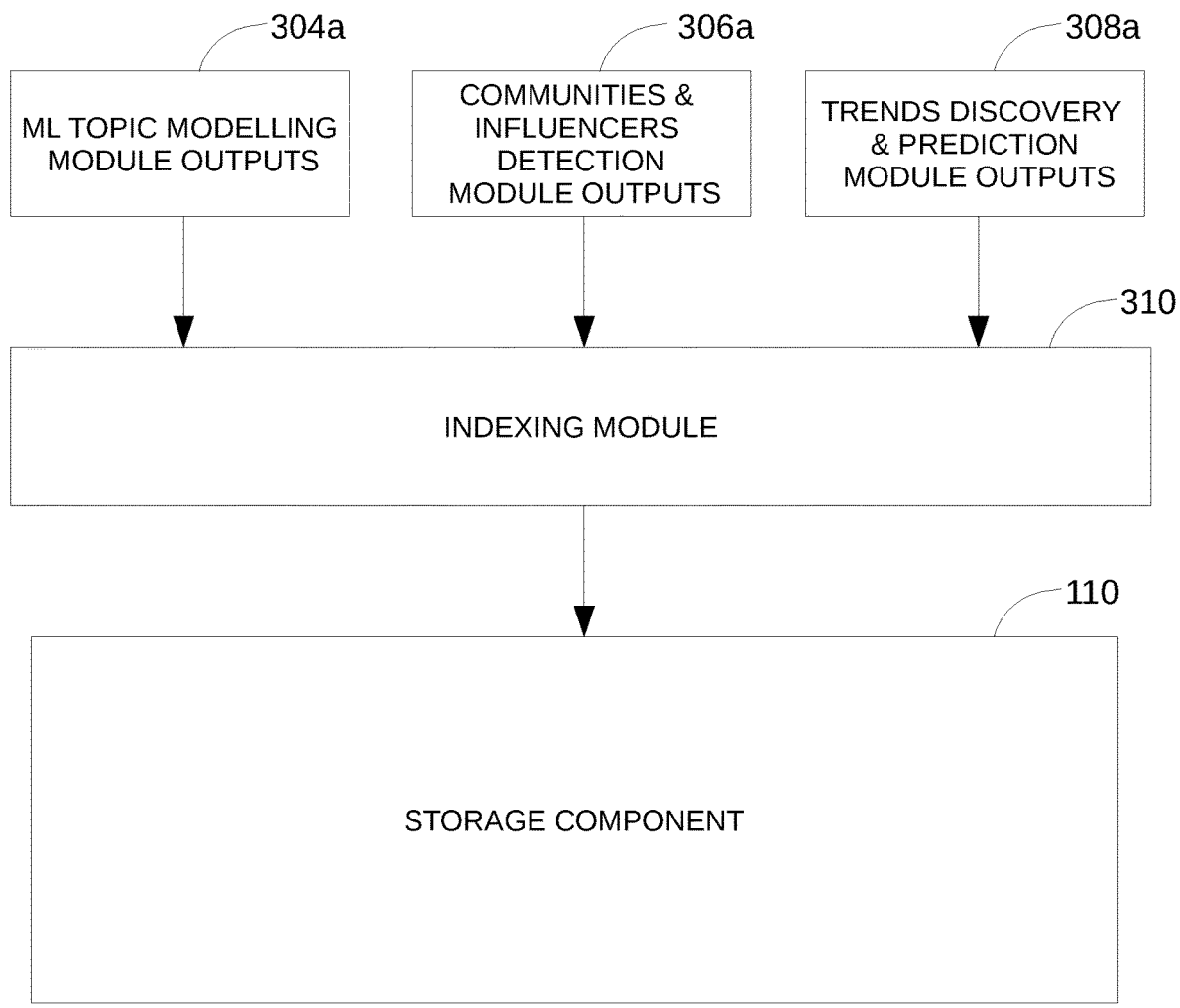
FIG. 3E illustrates example inputs and data storage types used by the indexing module 310 of the processing component 106 of FIG. 3.

FIG. 3E illustrates example inputs and data storage types used by the indexing module 310. The module 310 indexes the ML topic modelling module outputs 304a, communities and influencers detection module outputs 306a, and trends discovery and prediction module outputs 308a using a suitable format/technology. Data storage component 110 may include:
  Search engine platform (e.g. ElasticSearch, etc.).
  Graph database(s) for (306a output), such as Neo4j, Amazon Neptune, Azure Cosmos DB Gremlin API, etc.
  Time-series database(s) (for 308a TRENDS), such as InfluxDB, Timescale, Amazon TimeStream, Azure Time Series Insights, etc.
  Object storage (e.g. Amazon S3, Azure Blob Storage, etc.) to store ML models, training data, etc.

Figure 4:
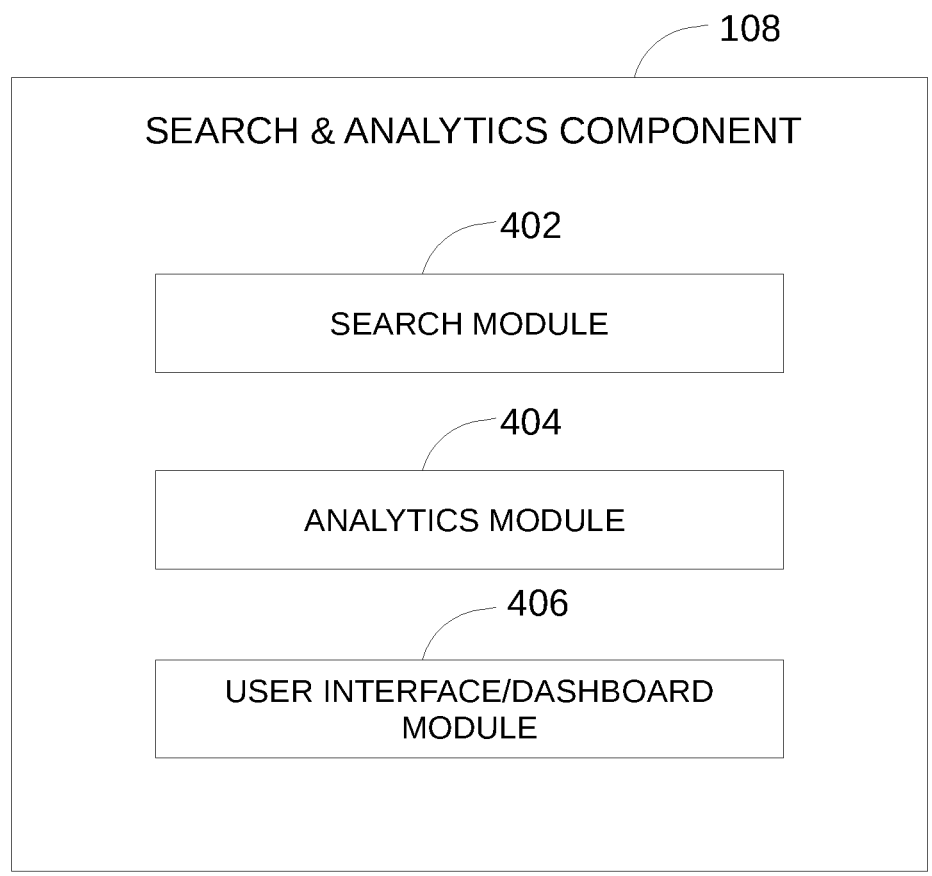
FIG. 4 illustrates a block diagram of the search and analytics component 108 of the system of FIG. 1.

FIG. 4 illustrates a block diagram of the search and analytics component 108, which is responsible for the presentation layer of the academic search and analytics apparatus 102.

In further detail, the search and analytics component 108 includes a search module 402, analytics module 404 and user interface/dashboard module 406. The search module 402 handles user's search queries by fetching relevant documents from the storage component 110. Then, analytics insights are dynamically produced by the analytics module 404 on the results returned by the search module 402. Finally, the relevant documents and insights are presented to the user's Internet browser by the user interface/dashboard module 406.

Alternatively, a user may explore the literature by clicking on topics/keywords insights produced by the ML topic modelling module 304, without the need of submit a search query.

Figure 4A:
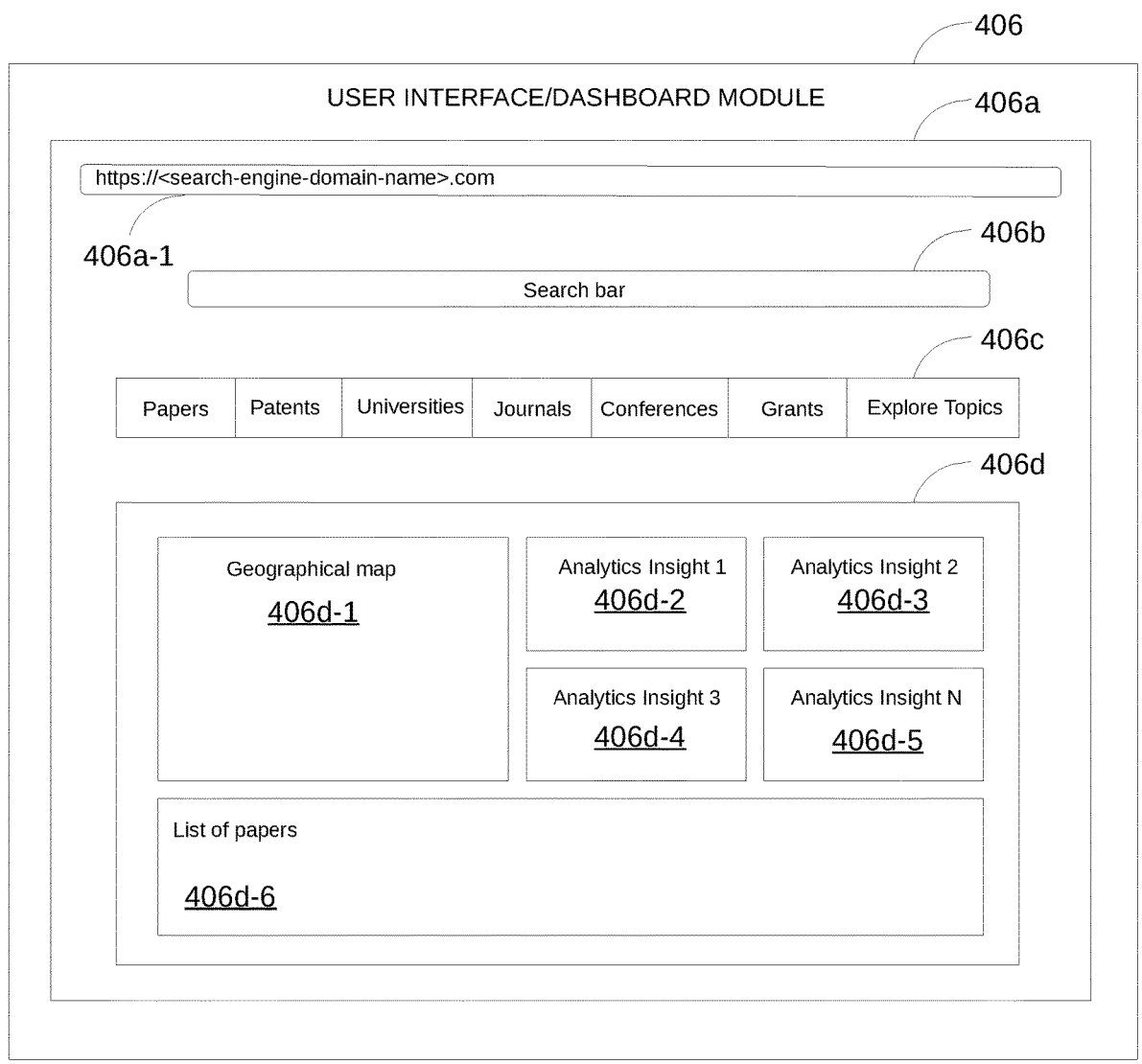
FIG. 4A illustrates an example of user interface/dashboard module 406 of search and analytics component 108 of FIG. 4.

FIG. 4A illustrates an example of user interface/dashboard module 406 of search and analytics component 108, where the academic search and analytics apparatus 102 can accessed using a web browser 406a. The apparatus interface may include an address bar 406a-1, a search bar 406b, a menu for analytics dimensions 406c, and a dashboard 406d. The dashboard provides 360-degrees view across several distentions, such as papers, patents, universities, journals, conferences, research grants, and exploration using ML generated topics/keywords without the need to provide a search query. If a search query is applied, or an analytics visual filter is applied, the retrieved papers and analytics insights are refreshed automatically across all analytics dimensions and menu items. So, the user can switch from one menu to another to see different prospective of his/her search query, which provides a comprehensive understanding of the research and inventions landscapes.

A user may expand/narrow down the results by interacting with one, or more, visual insight. For example, if the user is interested in only papers published in a specific year, or by a specific university, the user selects the year, or university, from the distribution of documents over time insight, or the university from the geographical map, and the search and analytics component 108 automatically narrows down the documents and adjusts other insights, such as distribution of documents per type of publication, e.g. journal, conference, book, patent, etc., to show only papers published in the selected year or by the selected university.

Figure 5:
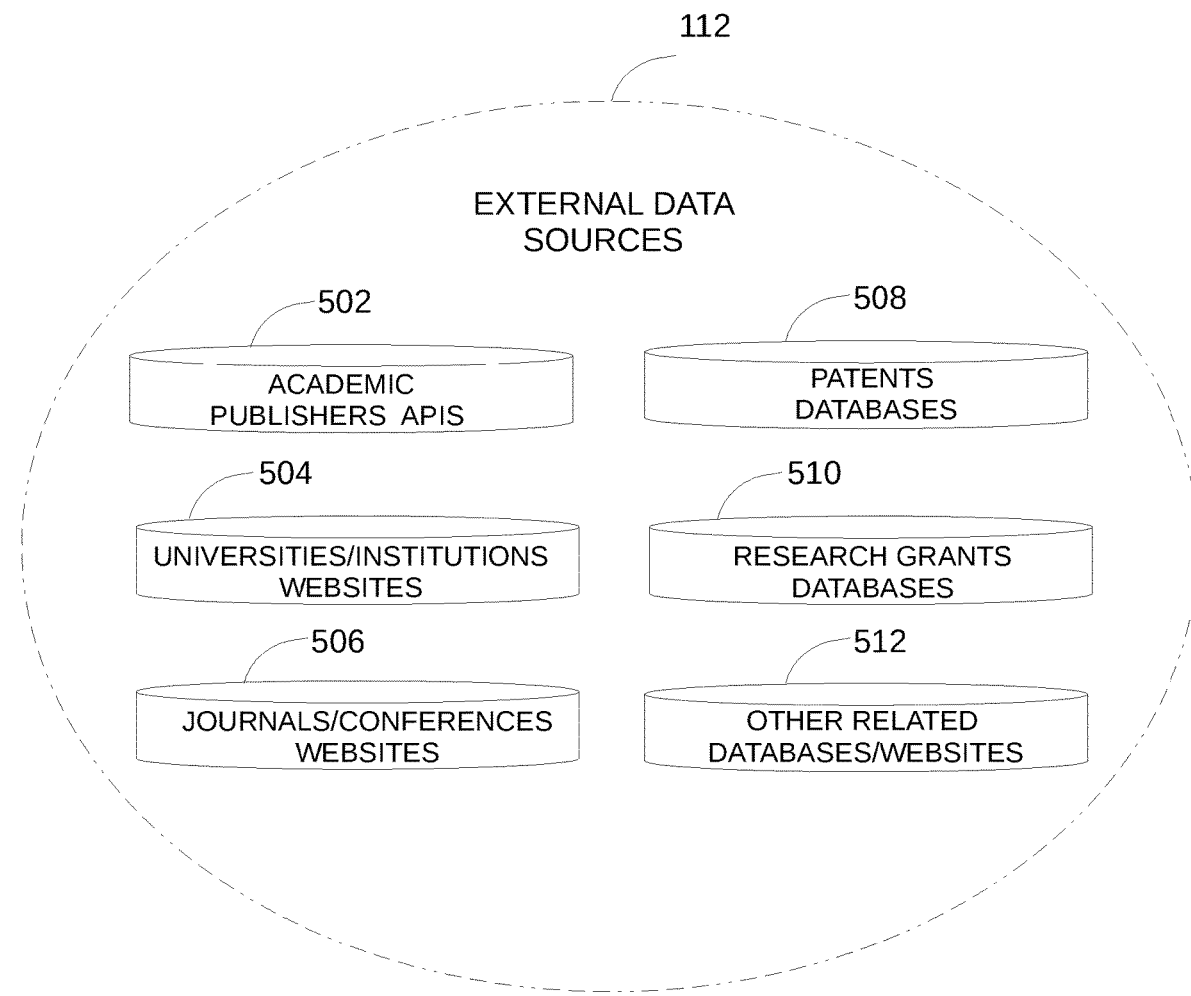
FIG. 5 presents examples of external data sources used by the system of FIG. 1.

The dashboard 406*d* comprises a geographical map 406*d*-1, analytics insight 1 406*d*-2, analytics insight 2 406*d*-3, analytics insights 3 406*d*-4, and analytics insight N 406*d*-5, and list of papers 406*d*-6, which is based on the search query and analytics filters, with papers information, for example title, abstract, authors, # of citations, publisher, URL, etc. FIG. 5 presents some examples of the external data sources 112 used by the academic search and analytics apparatus 102. The external data sources 112 may include, but not limited to, academic publishers APIs 502, universities/institutions websites 504, journals/conferences websites 506, patents databases 508, research grants databases 510, and other related databases/websites 512.

Figure 6:
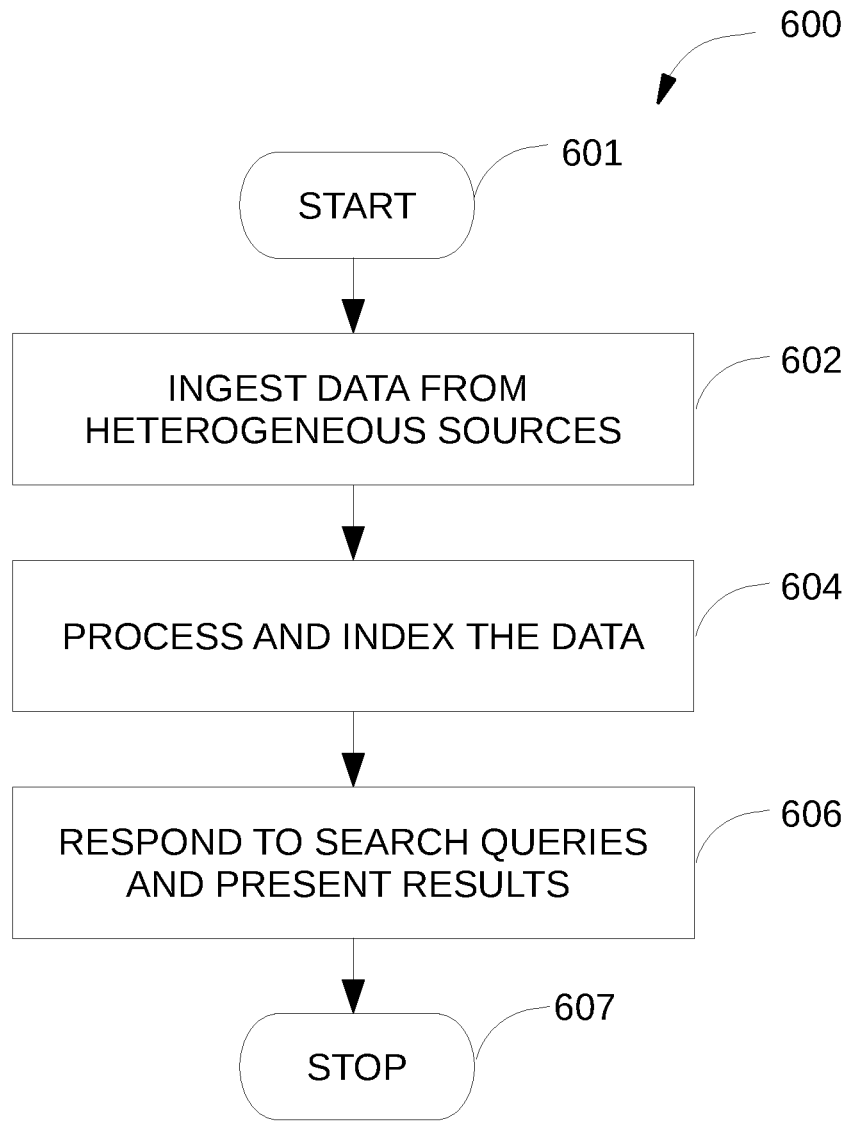
FIG. 6 illustrates a method of operation of the academic search and analytics insights system of FIG. 1.

FIG. 6 illustrates a method 600 for the overall operation of the academic search and analytics apparatus 102.

Upon start 601, at step 602, the data is ingested from the external heterogeneous data sources to the storage component 110 by the ingestion component 104.

At step 604, the ingested data is processed by the processing component 106, and indexed in the storage component 110.

At step 606, the search and analytics component 108 responds to user's search queries and presents results and insights to the user, followed by termination of the method 600 at step 607.

Figure 7:
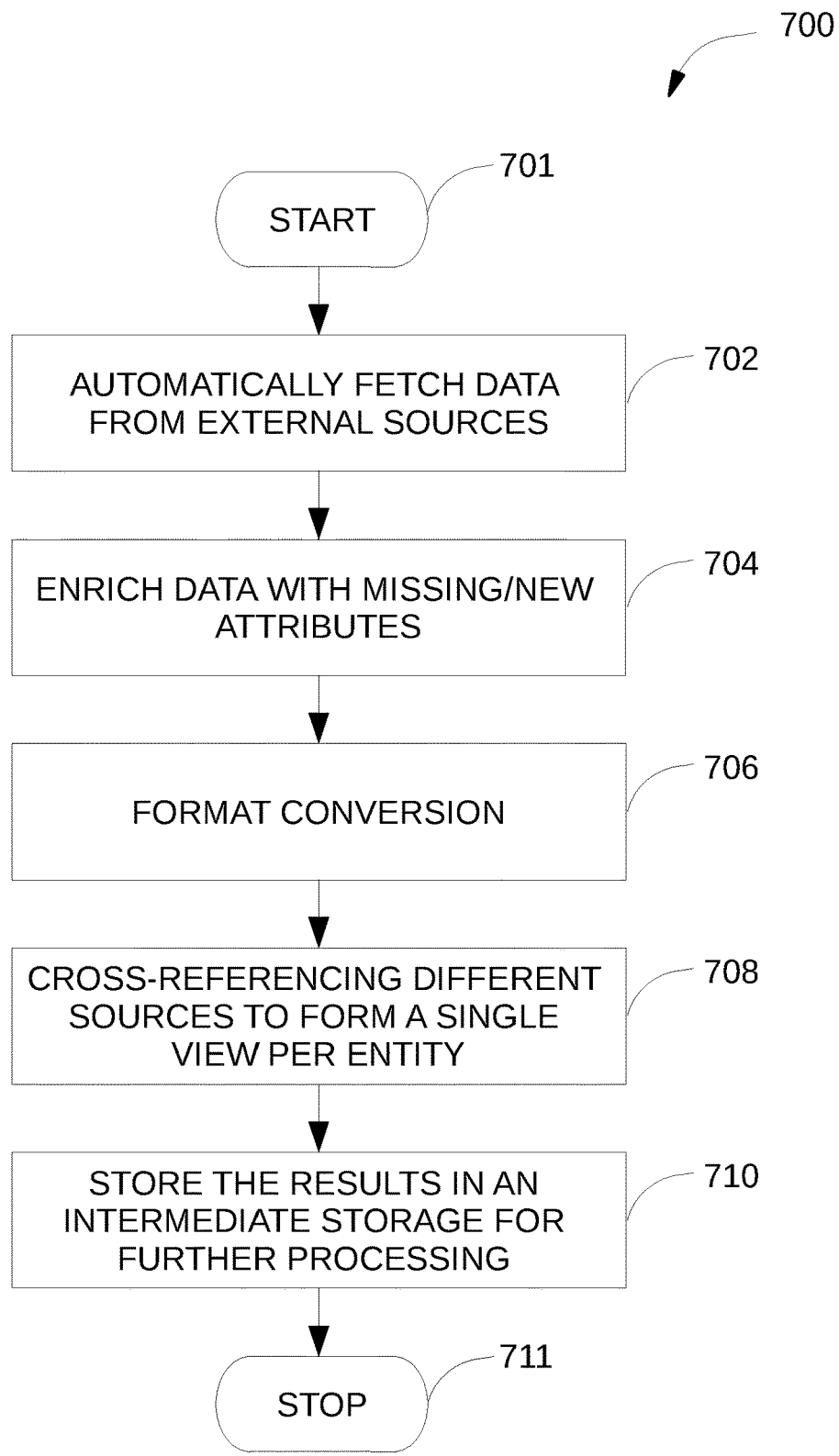
FIG. 7 illustrates a method for ingesting data from heterogeneous external data sources, for use in the system of FIG. 1.

FIG. 7 illustrates a method 700 for ingesting data from heterogeneous external data sources 112.

Upon start 701, at step 702, APIs module 202 and/or crawlers module 204 automatically fetch data from the external data sources 112.

At step 704, the fetched data is enriched with additional/missing attributes by the enrichment module 206.

At step 706, the data conversion to a common format is performed by the data conversion module 208.

At step 708, cross-referencing is performed by the cross-referencing/normalization module 210 to form a single view per entity.

And finally, at step 710, the results are stored in an intermediate storage provided by the storage component 110 for further processing, followed by the termination of the method 700 at step 711.

Figure 8:
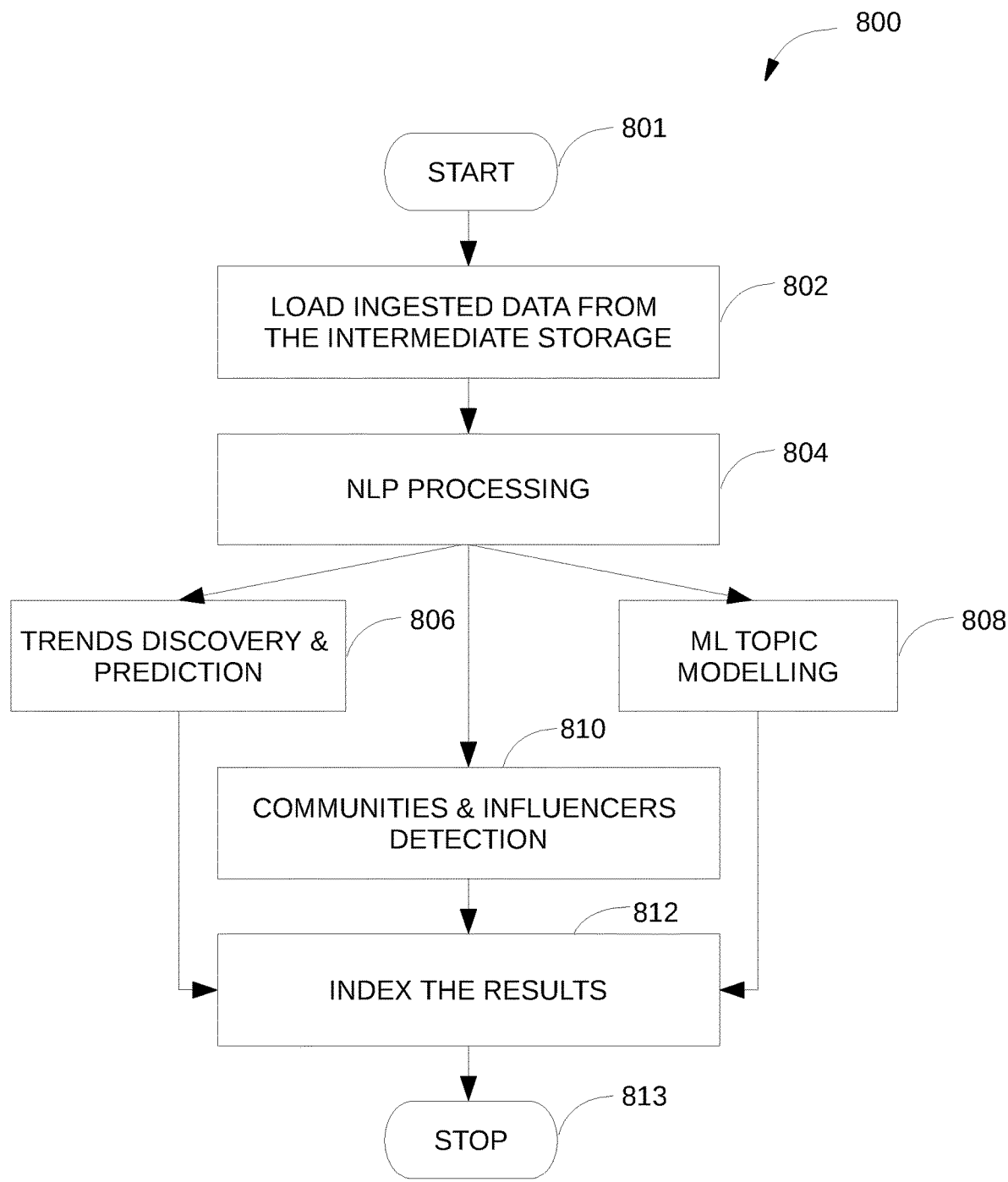
FIG. 8 illustrates a method for processing the data ingested by the method of FIG. 7.

FIG. 8 illustrates a method 800 for processing the ingested data.

Upon start 801, at step 802, the ingested data is loaded from the intermediate storage.

At step 804, NLP processing is performed by the NLP processing module 302.

Then, the steps of Trends Discovery & Prediction 806, ML Topic Modelling 808, and Communities & Influencers Detection 810 are executed in parallel, respectively by the ML Topic Modelling module 304, Communities and Influencers module 306, and Trends Discovery and Prediction module 308 of the Processing Component 106 of the Academic Search and Analytics Apparatus 102.

And finally, at step 812, the results are indexed in the storage component 110 by the indexing module 310, followed by the termination of the method 800 at step 813.

Figure 9:
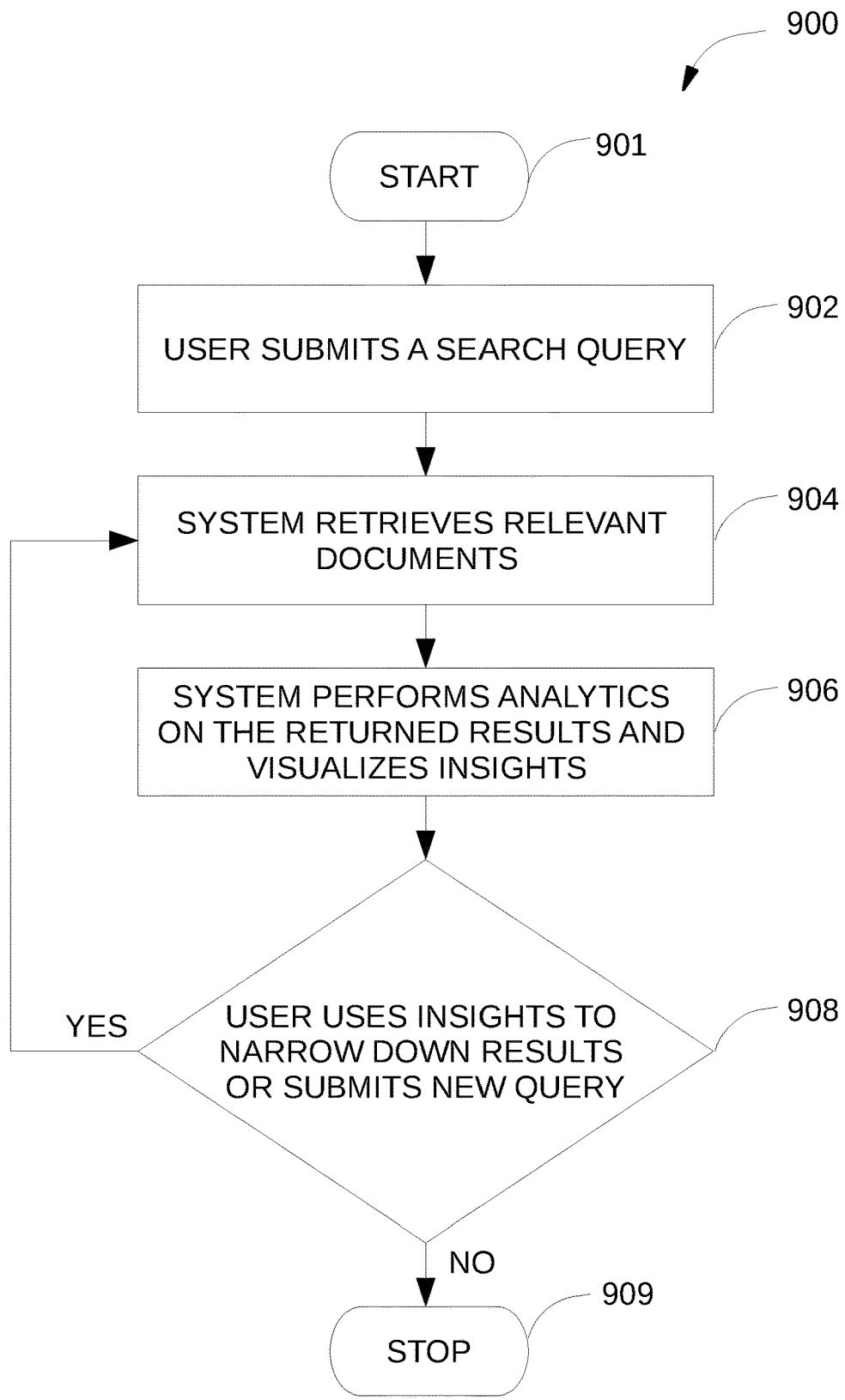
FIG. 9 illustrates a method for providing search and analytics insights to users of the system of FIG. 1.

FIG. 9 illustrates a method 900 for providing search and analytics insights to users.

Upon start 901, at step 902, a user submits a search query to the academic search and analytics apparatus 102 via the search and analytics component 108.

At step 904, the relevant documents are retrieved by the search module 402.

At step 906, the analytics module 404 performs analytics on the returned results and visualizes the insights as interactive charts, in addition to the list of relevant documents.

At step 908, the user may continue interacting with the academic search and analytics apparatus 102 to expand/narrow down the search by adjusting the interactive insights (exit "YES" from the step 908), returning the operation of the method 900 back to the step 904.

Alternatively, at the step 908, the user may submit new search queries (exit "NO" from the step 908), followed by the termination of the method 900 at step 909.

Figure 10:
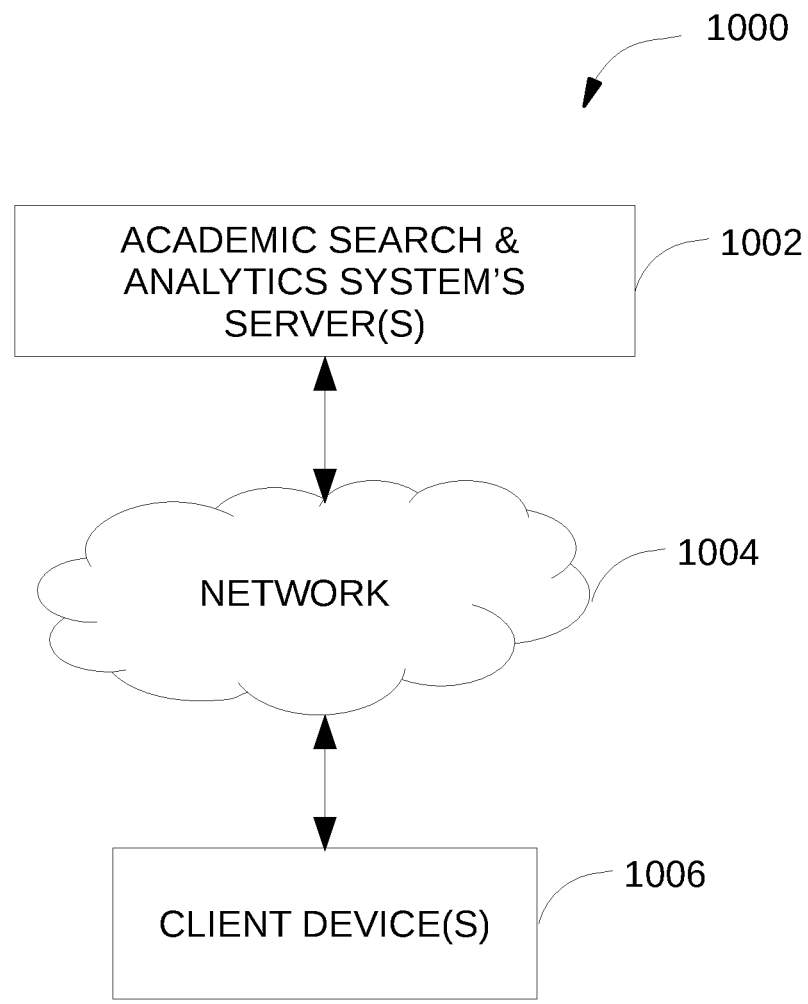
FIG. 10 illustrates a communication network system 1000 including the apparatus 102 for academic search and analytics insights of FIG. 1.

Referring now to FIG. 10, there is illustrated a schematic block diagram of an exemplary communication network system 1000 in accordance with embodiments of the present invention.

The communication network system 1000 includes one or more client devices 1006. The communication network system 1000 also includes one or more servers 1002 to host the academic search and analytics apparatus 102 of the embodiments of the present invention. And finally, the communication network system 1000 includes a communication network 1004 (e.g. a global communication network such as the Internet) that can be employed to facilitate communications between the client devices 1006 and the servers 1002.

The processes described above, as applied to academic search engines processing a vast amount of data, require the use of multiple hardware processors. A variety of processors, such as microprocessors, digital signal processors, and gate arrays, may be employed. Generally, processor-readable media are needed and may include floppy disks, hard disks, optical disks, Flash Read Only Memory (ROM), non-volatile ROM, and Random Access Memory (RAM).

Although methods and systems of the embodiments of the present invention have been described with regard to the academic search engine and analytics insights, it is understood that methods and systems of other embodiments of the present invention may be applied to general search engines, or other specialized search engines in other technology or application areas.

Systems and apparatus of the embodiments of the invention may be implemented as any of a variety of suitable circuitry, such as one or more microprocessors, digital signal processors (DSPs), application-specific integrated circuits (ASICs), field programmable gate arrays (FPGAs), discrete logic, software, hardware, firmware or any combinations thereof. When modules of the systems of the embodiments of the invention are implemented partially or entirely in software, the modules contain a memory device for storing software instructions in a suitable, non-transitory computer-readable storage medium, and software instructions are executed in hardware using one or more processors to perform the techniques of this disclosure.

It should be noted that methods and systems of the embodiments of the invention and data sets described above are not, in any sense, abstract or intangible. Instead, the data is necessarily presented in a digital form and stored in a physical data-storage computer-readable medium, such as an electronic memory, mass-storage device, or other physical, tangible, data-storage device and medium. It should also be noted that the currently described data-processing and data-storage methods cannot be carried out manually by a human analyst, because of the complexity and vast numbers of intermediate results generated for processing and analysis of even quite modest amounts of data. Instead, the methods described herein are necessarily carried out by electronic computing systems having processors on electronically or magnetically stored data, with the results of the data processing and data analysis digitally stored in one or more tangible, physical, data-storage devices and media.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

What is claimed is:

1. An apparatus for academic search and analytics insights, comprising:
    a non-transitory computer-readable storage medium, storing computer readable instructions for execution by a processor, comprising:
        an ingestion component, obtaining data from external heterogeneous sources, to produce ingested data, wherein the ingestion component further comprises:
            an application programming interface, API, module for automatically fetching data from external databases having API interfaces;
            a crawlers module for crawling, in parallel, predefined websites for extracting predetermined attributes; and
            an enrichment module for automatically obtaining additional or missing attributes of the ingested data from other sources;
        wherein a single index has been used to coordinate an operation of the API module, the crawler module and the enrichment module, thereby guiding what data needs to be acquired and eliminating duplicate work;
    a processing component for processing the ingested data, the processing component comprising:
        a Natural Language Processing (NLP) module operable on the ingested data to generate a pre-processed ingested data, the NLP module being in communication with:
            a machine learning (ML) modeling module, using the processor for grouping related data into topics and identifying respective keywords;
            a communities and influencers detection module for identifying communities of researchers; and
            a trends and discovery prediction module for predicting predetermined use cases based on historic data;
    and
    a search and analytics component for executing search queries on the pre-processed ingested data, and outputs of the machine learning modeling module, communities and influencers detection module, and trend and discovery prediction module, and generating the analytics insights on returned search results.

2. The apparatus of claim 1, wherein the enrichment module is further configured to obtain latitude and longitude coordinates of a university, and authors affiliated with the university, by querying an external application programming interface of an online mapping tool.

3. The apparatus of claim 1, wherein the ingestion component further comprises a format conversion module for converting the ingested data from the external heterogeneous sources into a common format, which is suitable for further processing by the NLP module.

4. The apparatus of claim 1, wherein the ingestion component further comprises a cross-referencing module for linking related information from the ingested data into a single record per entity.

5. The apparatus of claim 1, wherein the trends and discovery prediction module is configured to predict one or more of the following:
    a sudden increase or decrease in a number of publications of a specific research topic;
    a future number of publications per keywords or topic based on historic data; and
    a future number of citations per paper.

6. The apparatus of claim 1, wherein the communities of researchers comprise one or more of the following:
    community of researchers who collaborate with each other; and
    community of citations.

7. The apparatus of claim 1, wherein the search and analytics component further comprises:
    a search module for fetching the ingested data from a storage component based on a search query, to produce fetched data;
    an analytics module for generating analytics insights based on the fetched data; and
    a dashboard module for presenting the fetched data along with the analytics insights, while independently allowing accessibility to topics and keywords from the ML modeling module without a need of submitting a new search query.

8. The apparatus of claim 1, further comprising a storage component for storing the ingested data, the storage component acting as a communication data bus for the ingestion component, the processing component and the search and analytics component.

9. A computer implemented method for academic search and analytics insights, comprising:
    employing at least one hardware processor for:
        obtaining data from external heterogeneous sources, to produce ingested data, wherein the obtaining further comprises:
            automatically fetching data from external databases having application programming interfaces, APIs;
            crawling, in parallel, predefined websites for extracting predetermined attributes;
        enriching the fetching and the crawling, comprising automatically obtaining additional or missing attributes from other sources; and
        using a single index for coordinating the fetching, the crawling and the enriching, thereby guiding what data needs to be acquired and eliminating duplicate work;
        processing the ingested data, comprising:
            Natural Language Processing (NLP) of the ingested data to generate a pre-processed ingested data, the NLP being in communication with:
                machine learning modeling using the at least one hardware processor for grouping related data into topics and identifying respective keywords;
                identifying communities and influencers among researchers; and
                predicting predetermined use cases based on historic data;
            and
            executing search queries on the pre-processed ingested data and outputs of the machine learning modeling, the identifying, and the predicting, and generating the analytics insights on returned search results.

10. The method of claim 9, wherein the enriching further comprises obtaining latitude and longitude coordinates of a university, and authors affiliated with the university, by querying an external application programming interface of an online mapping tool.

11. The method of claim 9, wherein the obtaining further comprises converting the ingested data from the external heterogeneous sources into a common format suitable for further processing by the NLP module.

12. The method of claim 9, wherein the obtaining further comprises a cross-referencing the ingested data, comprising linking related information from the ingested data into a single record per entity.

13. The method of claim 9, wherein the predicting comprises one or more of the following:
   predicting a sudden increase or decrease in a number of publications of a specific research topic;
   predicting a future number of publications per keywords or topic based on historic data; and
   predicting a future number of citations per paper.

14. The method of claim 9, wherein the executing further comprises:
   fetching the ingested data from a storage component, based on a search query, to produce fetched data;
   generating analytics insights based on the fetched data; and
   presenting the fetched data along with the analytics insights at a dashboard, while independently allowing accessibility to topics and keywords from ML modeling module, without a need of submitting a new search query.

15. The method of claim 9, further comprising storing the ingested data in a storage component, the storage component acting as a communication data bus for the ingestion component, the processing component and the search and analytics component.

16. A server computer for academic search and analytics insights, comprising:
   at least one hardware processor;
   a non-transitory computer readable storage medium having computer executable instructions stored thereon for execution by the at least one hardware processor, causing the at least one hardware processor to:
      ingest data from external heterogeneous sources, to produce ingested data, wherein the computer executable instructions to ingest further cause the at least one hardware processor to:
         fetch data from external databases having application programming interfaces, APIs;
         crawl, in parallel, predefined websites for extracting predetermined attributes to produce crawled data;
         enrich the fetch data and the crawled data, comprising obtaining additional or missing attributes from other sources; and
         coordinate the fetch, the crawl and the enrich processes using a single index, thereby guiding what data needs to be acquired and eliminating duplicate work;
      process the ingested data, comprising:
         Natural Language Processing (NLP) of the ingested data to generate a pre-processed ingested data, the NLP being in communication with:
            machine learning modeling using the at least one hardware processor for grouping related data into topics and identifying respective keywords;
            identifying communities and influencers among researchers; and
            predicting predetermined use cases based on historic data; and
      execute search queries on the pre-processed ingested data and outputs of the machine learning modeling, the identifying, and the predicting, and generate the analytics insights on search results.

17. The server computer of claim 16, wherein the computer executable instructions further cause the at least one hardware processor to store the ingested data in a storage component, the storage component acting as a communication data bus for the ingestion component, the processing component and the search and analytics component.

18. The server computer of claim 16, wherein the computer executable instructions further cause the at least one hardware processor to cross-reference the ingested data, which comprises linking related information from the ingested data into a single record per entity.

19. A communication network, comprising:
   at least one server computer for academic search and analytics insights, comprising:
      a processor;
      a non-transitory computer readable storage medium having computer executable instructions stored thereon for execution by the processor, causing the processor to:
         ingest data from external heterogeneous sources, to produce ingested data, wherein the computer executable instructions to ingest further cause the at least one hardware processor to:
            fetch data from external databases having application programming interfaces, APIs;
            crawl, in parallel, predefined websites for extracting predetermined attributes to produce crawled data;
            enrich the fetch data and the crawled data, comprising obtaining additional or missing attributes from other sources; and
            coordinate the fetch, the crawl and the enrich processes using a single index, thereby guiding what data needs to be acquired and eliminating duplicate work;
         process the ingested data, comprising:
            Natural Language Processing (NLP) of the ingested data to generate a pre-processed ingested data, the NLP being in communication with:
               machine learning modeling using the processor for grouping related data into topics and identifying respective keywords;
               identifying communities and influencers among researchers; and
               predicting predetermined use cases based on historic data;
         and
         execute search queries on the pre-processed ingested data and outputs of the machine learning modeling, the identifying, and the predicting, and generate the analytics insights on search results;
      the server computer performing the academic search and analytics insights in response to a request from a client device.

20. The communication network of claim 19, wherein the computer executable instructions further cause the at least one hardware processor to store the ingested data in a storage component, the storage component acting as a communication data bus for the ingestion component, the processing component and the search and analytics component.

* * * * *